(12) United States Patent
Kappel et al.

(10) Patent No.: US 12,019,190 B2
(45) Date of Patent: Jun. 25, 2024

(54) TIME-OF-FLIGHT ARRANGEMENT AND METHOD FOR A TIME-OF-FLIGHT MEASUREMENT

(71) Applicant: ams AG, Premstaetten (AT)

(72) Inventors: Robert Kappel, Eindhoven (NL); Christian Mautner, Eindhoven (NL)

(73) Assignee: AMS AG, Premstaetten (AT)

( * ) Notice: Subject to any disclaimer, the term of this patent is extended or adjusted under 35 U.S.C. 154(b) by 1000 days.

(21) Appl. No.: 16/963,329

(22) PCT Filed: Jan. 30, 2019

(86) PCT No.: PCT/EP2019/052210
§ 371 (c)(1),
(2) Date: Jul. 20, 2020

(87) PCT Pub. No.: WO2019/149735
PCT Pub. Date: Aug. 8, 2019

(65) Prior Publication Data
US 2020/0379095 A1 Dec. 3, 2020

(30) Foreign Application Priority Data
Jan. 31, 2018 (EP) .................... 18154340

(51) Int. Cl.
*G01S 7/48* (2006.01)
*G01S 7/484* (2006.01)
(Continued)

(52) U.S. Cl.
CPC .......... *G01S 7/4866* (2013.01); *G01S 7/484* (2013.01); *G01S 7/497* (2013.01)

(58) Field of Classification Search
None
See application file for complete search history.

(56) References Cited

U.S. PATENT DOCUMENTS

| 2006/0202129 | A1 | 9/2006 | Niclass et al. |
| 2007/0096836 | A1 | 5/2007 | Lee et al. |

(Continued)

FOREIGN PATENT DOCUMENTS

| CN | 1598616 A | 3/2005 |
| CN | 101006363 A | 7/2007 |

(Continued)

OTHER PUBLICATIONS

Chinese Examination Report dated May 26, 2023, issued in Chinese Patent Application No. 201980010745.7, with English translation, 19 pages.

(Continued)

*Primary Examiner* — Hovhannes Baghdasaryan
(74) *Attorney, Agent, or Firm* — MH2 TECHNOLOGY LAW GROUP LLP

(57) ABSTRACT

A time-of-flight arrangement (10) comprises a laser (15), a laser driver (12), a clock generator (11) that is coupled to the laser (15) via the laser driver (12), a photodiode circuit (50) and a time-to-digital converter (14). The photodiode circuit (50) comprises an avalanche photodiode (51), a quenching circuit (52), a diode node (53) and a readout circuit (54). The quenching circuit (52) is coupled via the diode node (53) to the avalanche photodiode (51). An input of the readout circuit (54) is connected to the diode node (53). At least one of the clock generator (11) and the readout circuit (54) is coupled on its output side to the input side of the time-to-digital converter (14).

14 Claims, 17 Drawing Sheets

(51) Int. Cl.
    *G01S 7/4865* (2020.01)
    *G01S 7/497* (2006.01)

(56) References Cited

U.S. PATENT DOCUMENTS

| | | |
|---|---|---|
| 2007/0270693 A1 | 11/2007 | Fiedler et al. |
| 2012/0075615 A1 | 3/2012 | Niclass et al. |
| 2013/0153754 A1 | 6/2013 | Drader et al. |
| 2013/0300838 A1 | 11/2013 | Borowski |
| 2014/0232827 A1 | 8/2014 | Kumar et al. |
| 2015/0041625 A1 | 2/2015 | Dutton et al. |
| 2015/0077279 A1 | 3/2015 | Song et al. |
| 2016/0353084 A1 | 12/2016 | Sun et al. |
| 2017/0089756 A1 | 3/2017 | Scott et al. |
| 2017/0153319 A1 | 6/2017 | Villeneuve et al. |
| 2017/0363740 A1* | 12/2017 | Kubota ............... G01S 7/484 |
| 2018/0164415 A1* | 6/2018 | Buckley ............. G01S 7/4865 |

FOREIGN PATENT DOCUMENTS

| | | |
|---|---|---|
| EP | 3290950 A1 | 3/2018 |
| EP | 3460508 A1 | 3/2019 |
| EP | 3339985 B1 | 5/2019 |
| EP | 3355133 B1 | 10/2019 |
| JP | 2013137324 A | 7/2013 |

OTHER PUBLICATIONS

European Patent Office, International Search Report for PCT/EP2019/052210 dated May 2, 2019.

* cited by examiner

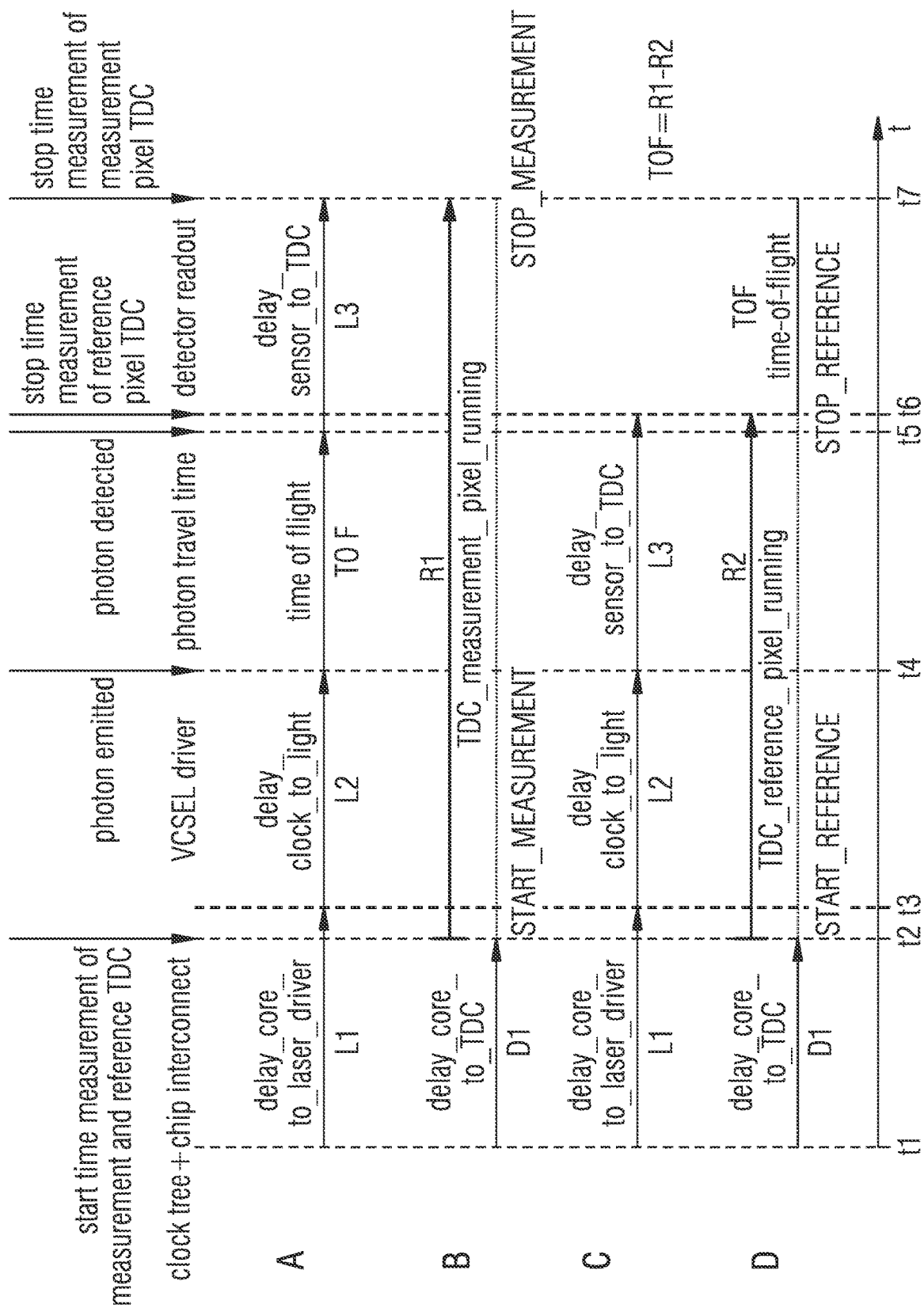

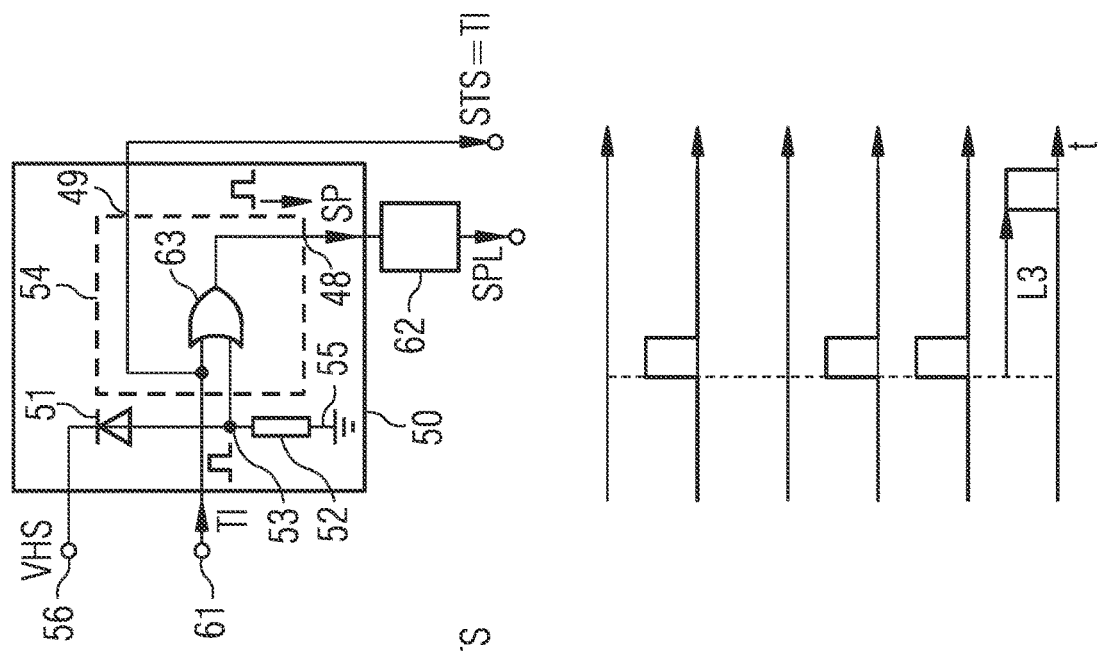
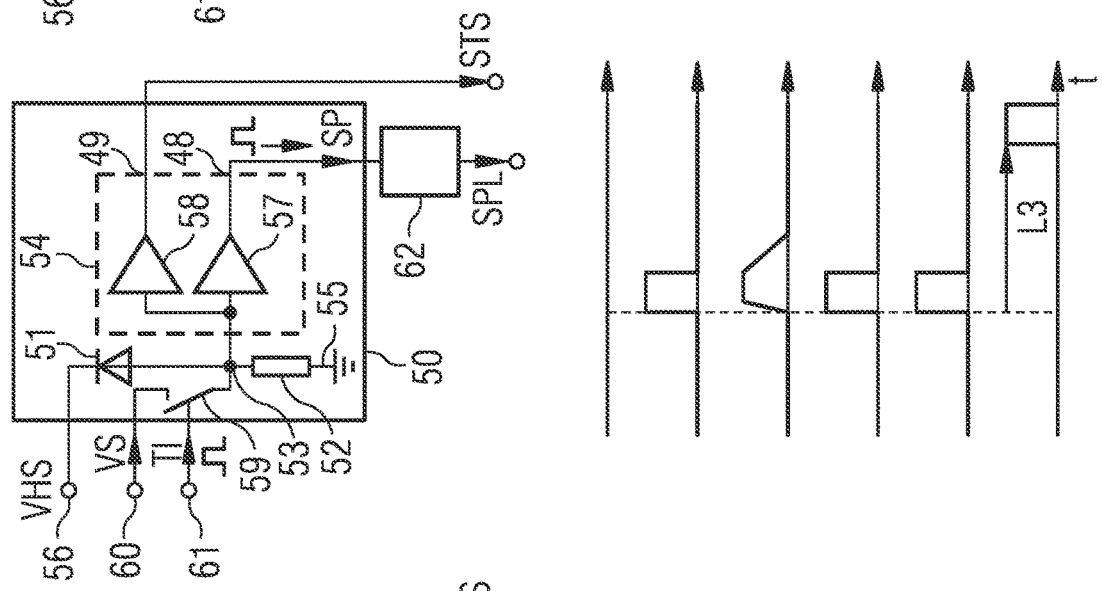
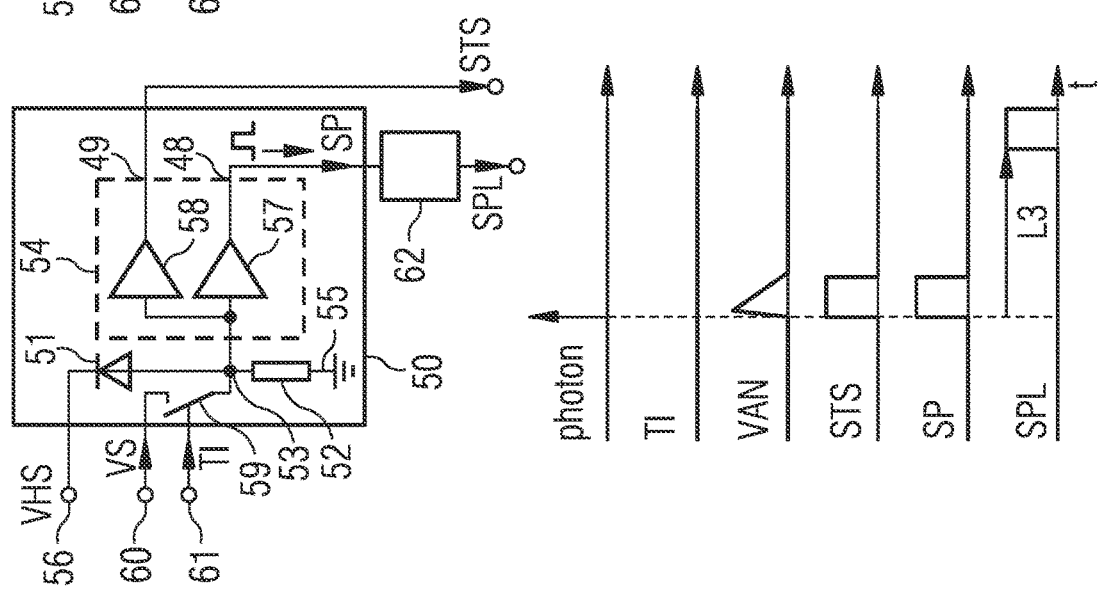

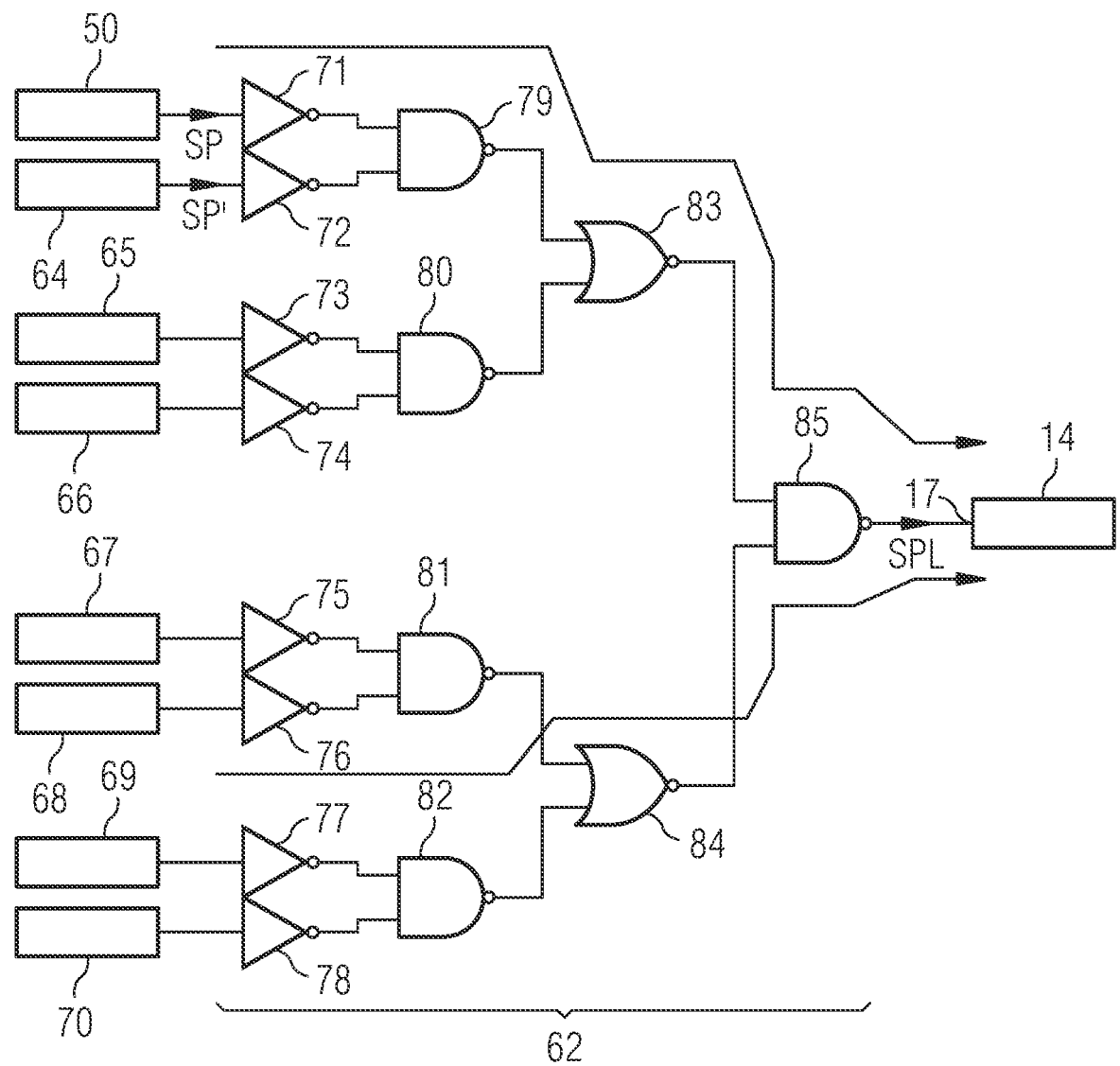

FIG 6
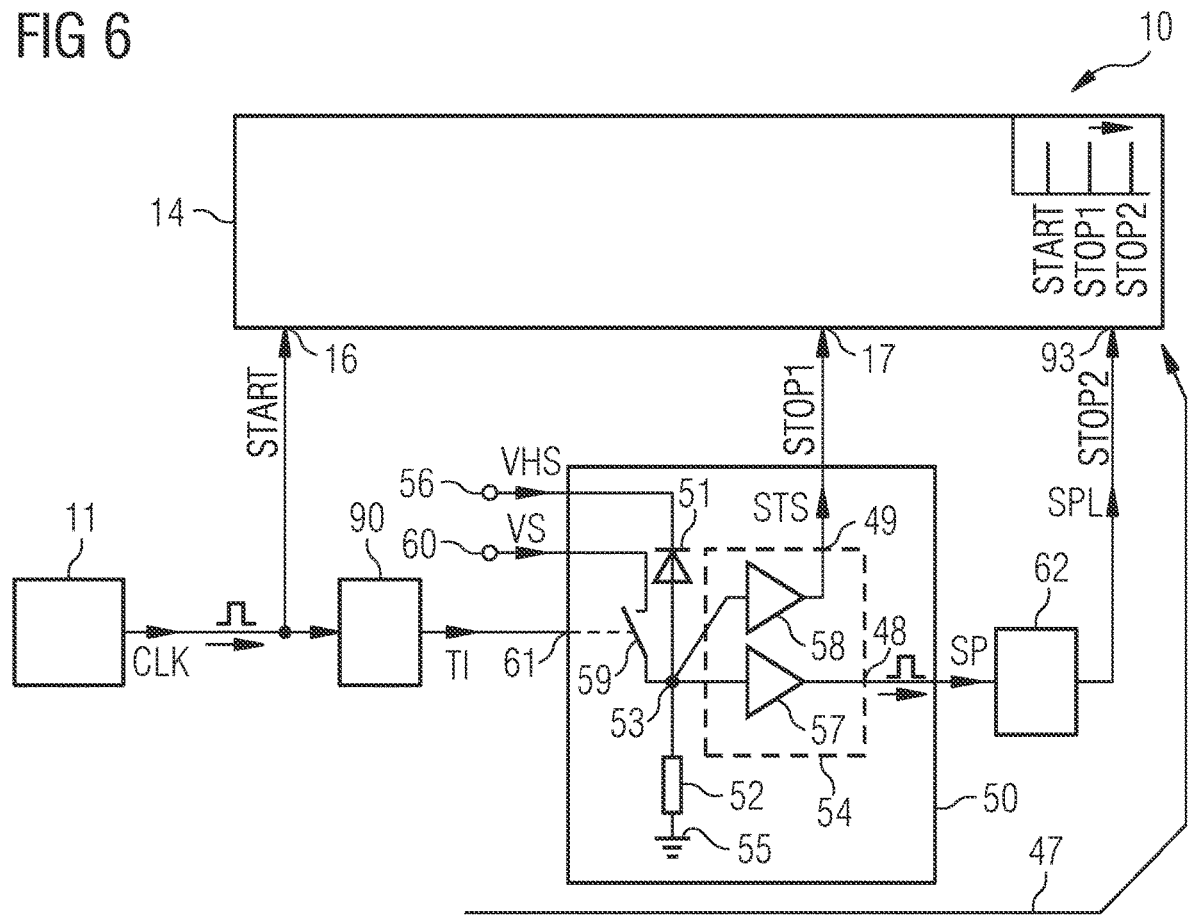
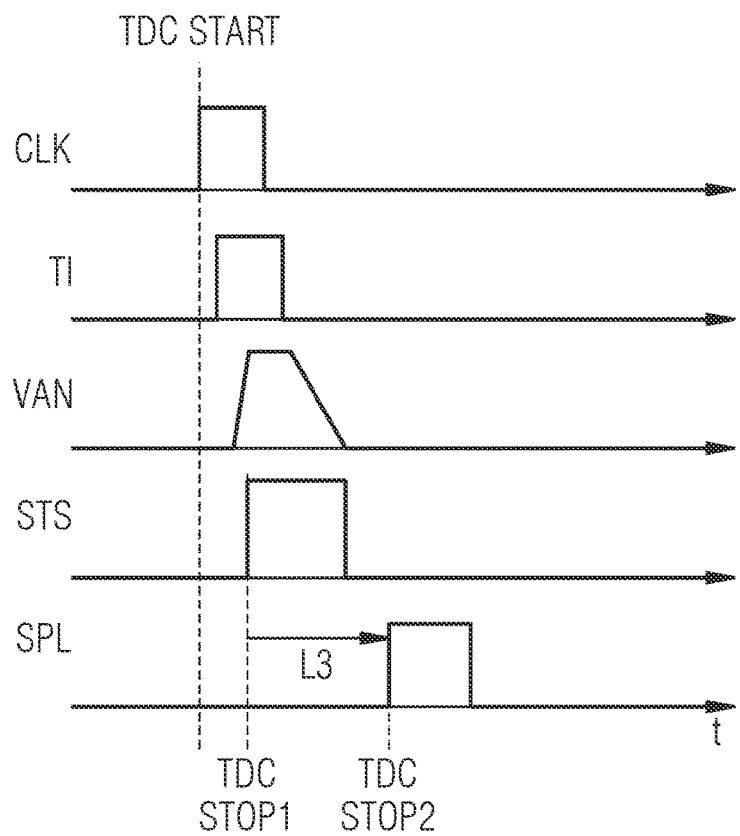

FIG 7
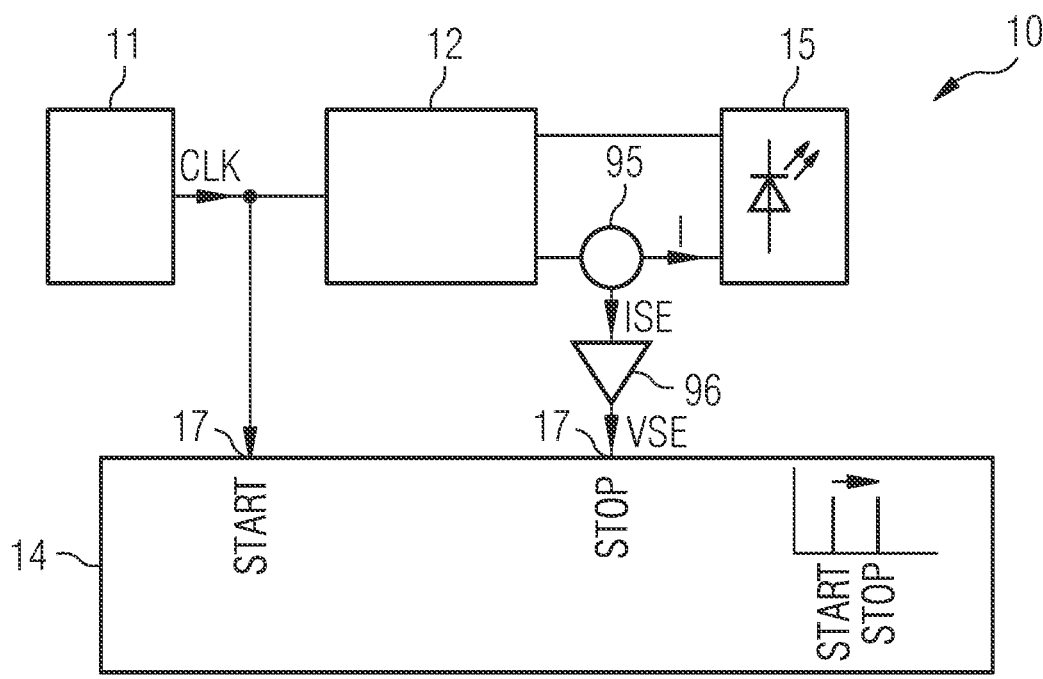
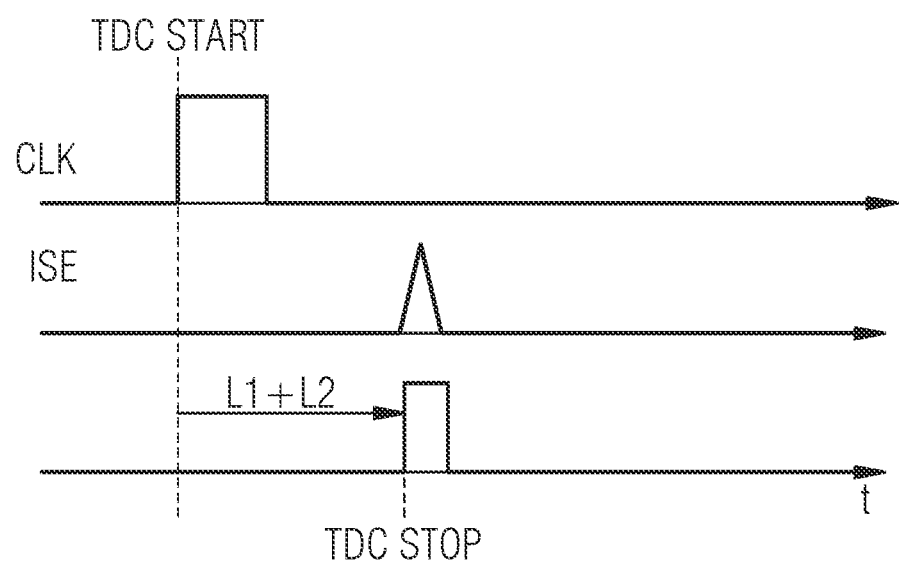

FIG 14
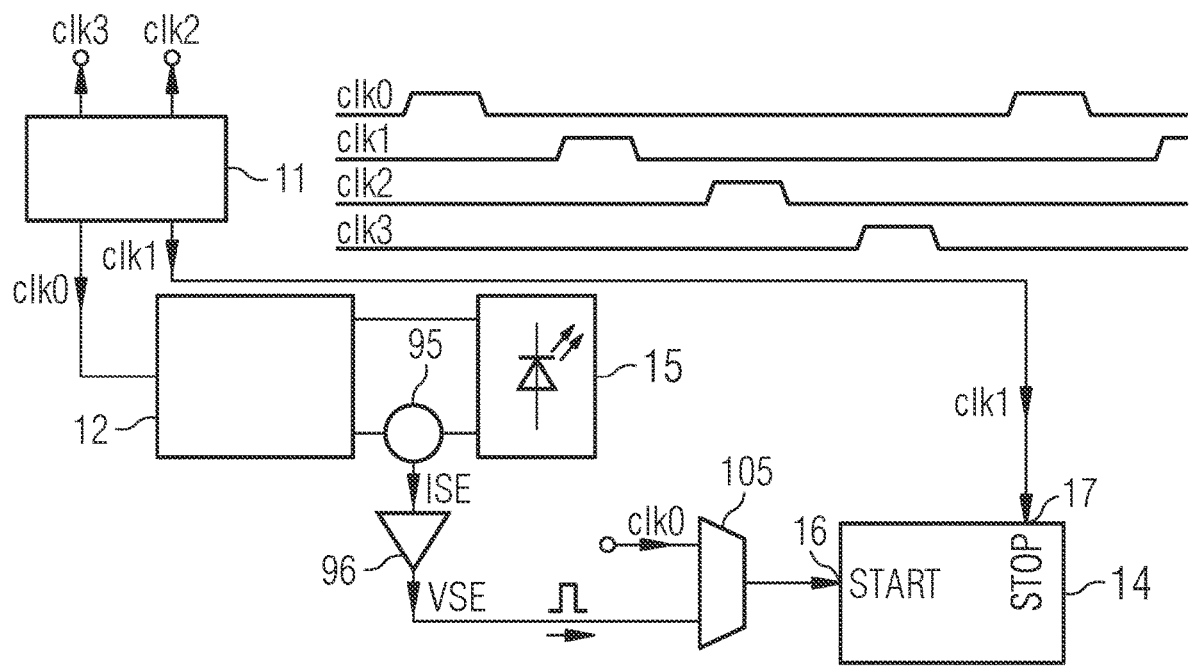
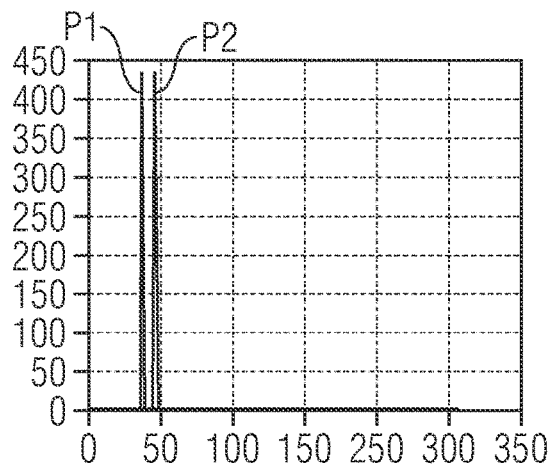

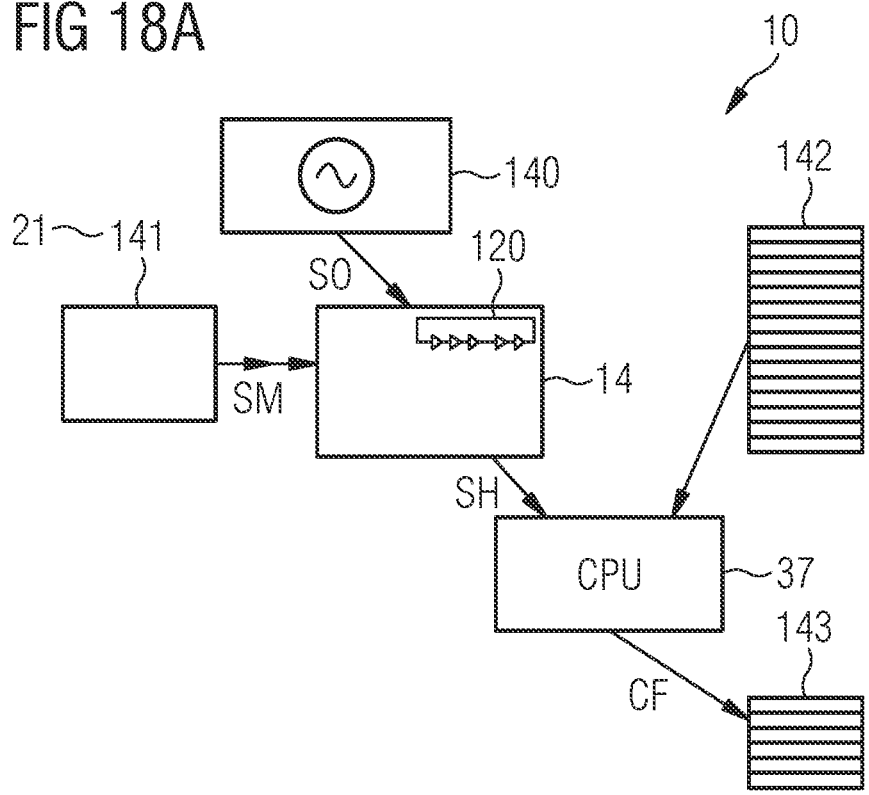
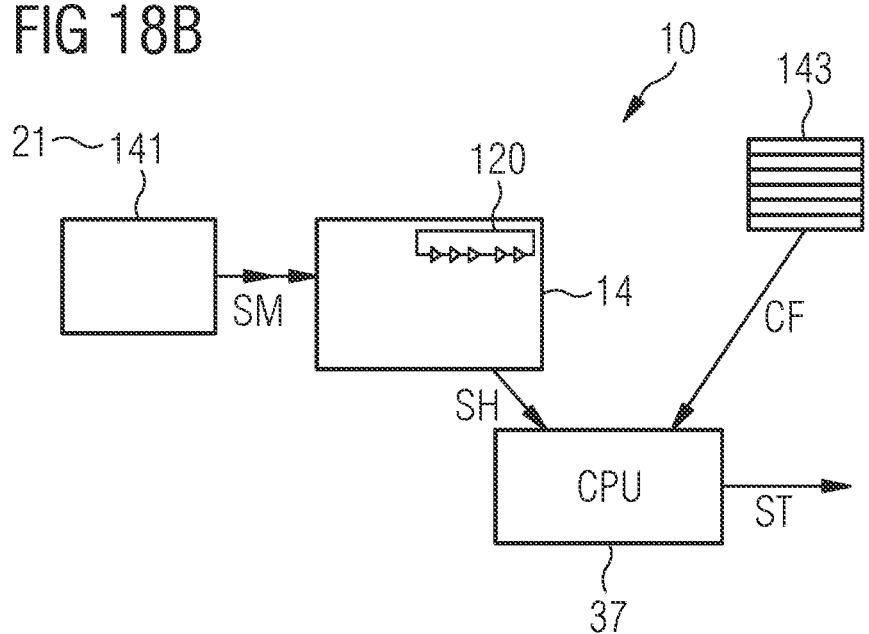

TIME-OF-FLIGHT ARRANGEMENT AND METHOD FOR A TIME-OF-FLIGHT MEASUREMENT

CROSS-REFERENCE TO RELATED APPLICATIONS

The present application is the national stage entry of International Patent Application No. PCT/EP2019/052210, filed on Jan. 30, 2019, which claims benefit of priority of European Patent Application No. 18154340.6 filed on Jan. 31, 2018, all of which are hereby incorporated by reference in their entirety for all purposes.

TECHNICAL FIELD

The present disclosure is related to a time-of-flight arrangement, abbreviated as TOF arrangement, and a method for a time-of-flight measurement, abbreviated as TOF measurement.

BACKGROUND

Such a TOF arrangement sends out a light pulse and measures the time it takes until a reflected light reaches a photodiode circuit. Such a TOF arrangement can also be called "time-of-flight device", "time-of-flight sensor" or "time-of-flight system". The photodiode circuit often comprises an avalanche photodiode such as a single photon avalanche photodiode, abbreviated as SPAD.

A direct time-of-flight system typically uses an optical reference path and an optical measurement path in order to detect the time stamp of the light emission and arrival of the laser beam. To achieve high time measurement precision, a reference sensor is used in addition to a measurement sensor by applying a differential measurement method. The reference sensor may be realized as a reference SPAD array. The measurement sensor may be configured as a measurement SPAD array. The delay between the electrical signal of a driver of a laser and the reference sensor as well as the delay between the electrical signal of the driver of the laser and the measurement sensor are measured. Subtracting both results directly leads to the time of flight and cancels out systematic errors of the response time of the driver circuit, the laser and the readout circuitry. The reference sensor needs to be separated from the measurement sensor with an optical barrier to prevent detection of the crosstalk-based reference signal at the measurement sensor. Considering a single die system comprising the sensor and the driver in a package, the optical barrier needs to be connected directly to the silicon die. This results in a high effort and costly package design.

The definitions as described above also apply to the following description unless otherwise stated.

SUMMARY

In an embodiment, a time-of-flight arrangement, abbreviated as TOF arrangement, comprises a laser, a laser driver, a clock generator that is coupled to the laser via the laser driver, a photodiode circuit and a time-to-digital converter. The photodiode circuit comprises an avalanche photodiode, a diode node, a quenching circuit and a readout circuit. The quenching circuit is coupled via the diode node to the avalanche photodiode. An input of the readout circuit is connected to the diode node. At least one of the clock generator and the readout circuit is coupled on its output side to the input side of the time-to-digital converter, abbreviated converter or TDC.

In an embodiment, the TOF arrangement is configured to operate in a calibration phase and in a measurement phase, wherein a delay information is determined in the calibration phase. The measurement of the delay information results in a high accuracy of the measurement of the time-of-flight.

In an embodiment, the TOF arrangement is free of an optical reference path and thus is free of an optical barrier between a measurement photodiode circuit and a reference photodiode circuit. Thus, the effort is reduced.

The measurement phase may follow the calibration phase.

In a further development, the delay information that is determined in the calibration phase is used in the measurement phase. In the measurement phase, a parameter of a circuit of the TOF arrangement is set as a function of the delay information or a measurement result, e.g. stored in a histogram, is shifted as a function of the delay information.

In an embodiment, the TOF arrangement comprises an electrical calibration path and a measurement path which both couples the output side of the clock generator to the input side of the TDC. The electrical calibration path is free of any optical signal transmission.

In an embodiment, the electrical calibration path comprises the laser driver, the current sensor, the photodiode circuit and optionally the readout logic. An output of the current sensor may be coupled to a trigger input of the photodiode circuit.

In an embodiment, the laser is implemented as a laser diode. The laser may be a vertical-cavity surface-emitting laser, abbreviated as VCSEL, or a vertical-external-cavity surface-emitting-laser, abbreviated as VECSEL.

The avalanche photodiode may be realized as a single photon avalanche photodiode, abbreviated as SPAD.

In an embodiment, the avalanche photodiode may be operated in the single photon avalanche photodiode mode. In the measurement phase, the avalanche photodiode receives such a high sensor supply voltage that a single photon is able to trigger the avalanche photodiode.

In an embodiment, the readout circuit comprises a sense buffer having an input connected to the diode node and a readout buffer having an input coupled to the diode node.

In an embodiment, an output of the sense buffer is coupled to the input side of the TDC, e.g. to a start input of the TDC or a first stop input of the TDC. The output of the sense buffer may be directly connected to the input side of the TDC, e.g. to the start input of the TDC or the first stop input of the TDC.

In an embodiment, the readout buffer is coupled to the input side of the TDC, e.g. to a first or a second stop input of the TDC via a readout logic of the TDC.

In an embodiment, an output of the readout buffer is coupled or connected to an input of a readout logic of the TOF arrangement. An output of the readout logic is coupled or connected to the input side of the TDC.

In an alternative embodiment, the readout circuit comprises the readout buffer having an input connected to the diode node. The output of the readout buffer is directly connected to the input side of the TDC, e.g. to the start input of the TDC or the first stop input of the TDC. Additionally, the output of the readout buffer is coupled via the readout logic of the TDC to the input side of the TDC, e.g. to the first or the second stop input of the TDC. Optionally, the readout circuit may be free of a sense buffer having an input coupled to the diode node.

In an embodiment, the TDC comprises a ring oscillator, a counter, a first and a second latch, an evaluation block and a histogram block. The first and the second latch are connected on its input side to the ring oscillator and the counter and on its output side via the evaluation block to the histogram block.

In an embodiment, a control input of the first latch is connected to a start input of the TDC. At a signal at the start input, the states of elements of a ring oscillator of the TDC and a counter value of a counter of the TDC are stored in the first latch. A control input of the second latch is connected to a first stop input of the TDC. At a signal at the first stop input, the states of the elements of the ring oscillator and the counter value are stored in the second latch.

In an embodiment, the TDC comprises a third latch that is connected on its input side to the ring oscillator and to the counter and on its output side via the evaluation block to the histogram block.

A control input of the third latch may be connected to the second stop input of the TDC. At a signal at the second stop input, the states of the elements of the ring oscillator and the counter value may be stored in the third latch.

In an embodiment, the counter is connected on its input side to the ring oscillator.

In an embodiment, the ring oscillator comprises a plurality of inverting elements. Optionally, the ring oscillator may additionally comprise a logic element. The counter is connected on its input side to an output of one of the plurality of inverting elements or to an output of the logic element.

In an embodiment, the photodiode circuit is configured such that the photodiode circuit can be triggered electrically. During the calibration phase, electric triggering of the photodiode circuit is performed.

In an embodiment, the photodiode circuit comprises an enable switch, a supply terminal and a trigger input. The clock generator is coupled on its output side to the trigger input.

The trigger input is connected to a control terminal of the enable switch. The enable switch couples the supply terminal to the diode node.

A trigger signal provided to the trigger input artificially triggers the photodiode circuit. In the calibration phase, after the trigger signal is provided to the trigger input, the photodiode circuit provides signals such as e.g. a readout signal and/or a trigger sense signal which are equal or approximately equal to signals that are generated by the photodiode circuit in case a photon hits the avalanche photodiode in the measurement phase.

In an embodiment, the photodiode circuit comprises the trigger input. The readout circuit comprises a readout gate having a first input coupled via the trigger input to the clock generator and a second input coupled to the diode node.

In an embodiment, the trigger input is coupled to the start input. The output of readout gate is coupled to the first stop input.

In an alternative embodiment, the trigger input is coupled to the first stop input. The output of readout gate is coupled to the second stop input.

In an embodiment, an output of the clock generator is coupled to a start input of the TDC. The output of the clock generator may be directly connected to the start input of the TDC.

In an alternative embodiment, the output of the clock generator is coupled to the start input of the TDC via at least one of an additional buffer, an adjustable delay circuit and the photodiode circuit In an embodiment, the TOF arrangement comprises a current sensor coupled to the laser. The current sensor measures a current flowing through the laser. The current sensor may be arranged between the laser driver and the laser.

An output of the current sensor may be coupled to the input side of the TDC, such as e.g. the start input or the first stop input of the TDC. The output of the current sensor may be coupled to the trigger input of the photodiode circuit.

In an embodiment, the TOF arrangement comprises the adjustable delay circuit having an input coupled to the output of the clock generator and having an output coupled to the input side of the TDC, e.g. to the start input or the first stop input of the TDC, in the measurement phase.

In an embodiment, the delay generated by the adjustable delay circuit is set as a function of the delay information, e.g. during the measurement phase.

In an embodiment, a method for a time-of-flight measurement, shorted as TOF measurement, comprises operating a TOF arrangement. The TOF arrangement comprises a laser, a laser driver, a clock generator that is coupled to the laser via the laser driver, a photodiode circuit and a TDC. The photodiode circuit comprises an avalanche photodiode, a quenching circuit, a diode node and a readout circuit. The quenching circuit is coupled via the diode node to the avalanche photodiode. An input of the readout circuit is connected to the diode node. At least one of the clock generator and the readout circuit is coupled on its output side to the input side of the TDC.

In an embodiment of the method, the TOF arrangement determines a delay information in a calibration phase and uses the delay information in a measurement phase.

A delay information is known at the end of the calibration phase. For example, a delay generated by the laser driver can be determined during the calibration phase.

Alternatively or additionally, a delay of the circuits between the diode node of the photodiode circuit and the input side of the TDC (such as a readout logic) can be determined in the calibration phase. The delay information may have a value that is a function of at least one of the delay of the laser driver and the delay of the circuits between the diode node and the input side of the TDC.

Since these delays are known, the influence of the delays on the result in the measurement phase can be reduced or eliminated without using an optical reference path. Thus, a TOF arrangement is free of an optical barrier that separates the at least one photodiode circuit comprised by a calibration or reference sensor from at least another photodiode circuit comprised by a measurement sensor.

In an embodiment, the TOF arrangement operates in the calibration phase and in the measurement phase.

In an embodiment, in the measurement phase, a parameter of a circuit of the TOF arrangement is set as a function of the delay information or a measurement result is shifted as a function of the delay information.

The method for a TOF measurement may be implemented, for example, by the TOF arrangement according to one of the embodiments defined above. The method for a TOF measurement may be realized as method for operating the TOF arrangement.

In an embodiment, the clock generator generates a clock signal. The clock signal is provided to an input of the laser driver. The laser driver provides a current to the laser as a function of the clock signal. A step in the clock signal triggers the generation of the current and thus the emission of photons by the laser.

In an embodiment, a pulse of a clock signal is directly or indirectly provided by the clock generator to an input side of the TDC, e.g. to a start input of the TDC or a further input of the TDC.

In an embodiment, a pulse of a clock signal is provided by the clock generator to the laser driver that generates a current that is applied to the laser such that the laser emits a pulse of light.

In an embodiment, the photodiode circuit provides signals such as e.g. a readout signal and/or a trigger sense signal. The readout circuit may provide signals such as e.g. the readout signal and/or the trigger sense signal.

The TOF arrangement may be fabricated as a system-on-chip, abbreviated as SOC. The TOF arrangement may be realized as single detector time-of-flight system.

A module complexity can be reduced significantly by getting rid of a reference sensor or a reference sensor array and a barrier across the die, as the TOF arrangement can use a separate cavity solution in that case. In the separate cavity solution, the laser and the sensor die that includes the measurement sensor are located in different cavities leading to a simpler package design.

A reference sensor is no longer needed because the propagation delay of the laser driver and the readout delay of the sensor is measured during a calibration phase using the TDC. The optical barrier can be placed between the sensor die and the die of the laser, instead of having the barrier on the sensor die. The laser may be a VCSEL. Thus, a die area is reduced and a power consumption is reduced due to lack of a reference sensor. A package is simplified as a barrier across the sensor die is no longer needed. The laser and the sensor die can be located in separate cavities. This results from the calibration phase or the calibration phases.

The disclosure is related to a TOF device with just a single measurement sensor and no over-die barrier and proposes a TOF arrangement that is free of a reference sensor. The TOF arrangement uses one or more than one calibration schemes to completely avoid the reference sensor. Possible effects are: Reduced package size, reduced package complexity, higher package yield due reduced complexity and reduced die size, therefore reduced costs. Possibly even improved quality and reliability of the TOF arrangement could be achieved.

The TOF arrangement can be realized as a TOF sensor without a reference sensor. The TOF arrangement may use an internal calibration to measure emitter and sensor.

In an embodiment, the method uses a time-measurement circuit realized as a time-to-digital converter (abbreviated TDC) to measure the delay of photon generation and sensor readout in a pre-measurement calibration sequence. Therefore, an electrical trigger signal is injected at the diode node or SPAD anode or the readout buffer that propagates through the SPAD readout logic to the TDC.

In an alternative development, the TOF arrangement comprises a further oscillator coupled to the TDC, a first and a second memory and an evaluation circuit coupled to the TDC and the first and the second memory. The TDC comprises a ring oscillator. In the calibration phase, the evaluation circuit determines a compensation factor using a signal generated by the TDC and a table stored in the first memory and stores the compensation factor in the second memory. In the measurement phase, the evaluation circuit determines a time-of-flight signal using the compensation factor and the histogram signal provided by the TDC.

In an embodiment, the TOF arrangement uses a local ring oscillator to determine the PVT operating condition and uses this information to calculate compensation values or the compensation factor which can be in turn used to calculate distance from TDC measurements. PVT is the abbreviation for process, voltage and temperature. Variations in a fabrication process, a supply voltage and a temperature of the TOF arrangement may influence the operating corner of the TOF arrangement and thus the accuracy of the measurement of the time-of-flight and of the measured distance to a target. The TOF arrangement uses a ring oscillator. The ring oscillator may be a high speed ring oscillator. For example, the time-to-digital converter comprises a ring oscillator. By measuring the frequency of the ring oscillator in relation to either a trimmed on-die oscillator or an accurate external frequency source, the speed of the silicon can be determined quite exactly. Using this information, possibly along with a table or tables that have been generated using measurement or simulations, the operating corner of the TOF arrangement is determined directly. This information can be used when calculating the absolute distance in a target measurement. Thus, a separate calibration cycle may be not be required. Such a TOF arrangement can be realized independent from the TOF arrangement using a calibration phase or calibration path described in this disclosure.

The following description of figures of embodiments may further illustrate and explain aspects of the TOF arrangement and the method for a TOF measurement. Devices and circuit parts with the same structure and the same effect, respectively, appear with equivalent reference symbols. In so far as devices or circuit parts correspond to one another in terms of their function in different figures, the description thereof is not repeated for each of the following figures.

BRIEF DESCRIPTION OF THE DRAWINGS

FIG. 2 shows an example of the duration and delays of signals of the TOF arrangement as shown in FIG. 1;

FIGS. 3A to 3C show example implementations of a photodiode circuit and of signals of a photodiode circuit;

FIG. 4 shows an example implementation of a readout logic;

FIGS. 5 and 6 show example implementations of a TOF arrangement with a photodiode circuit;

FIGS. 7 and 8 show additional example implementations of a TOF arrangement comprising a laser driver and a laser;

FIGS. 14 to 16 show additional example implementations of a TOF arrangement with further details;

FIGS. 18A and 18B show an alternative example implementation of a TOF arrangement.

DETAILED DESCRIPTION

Figure 1:
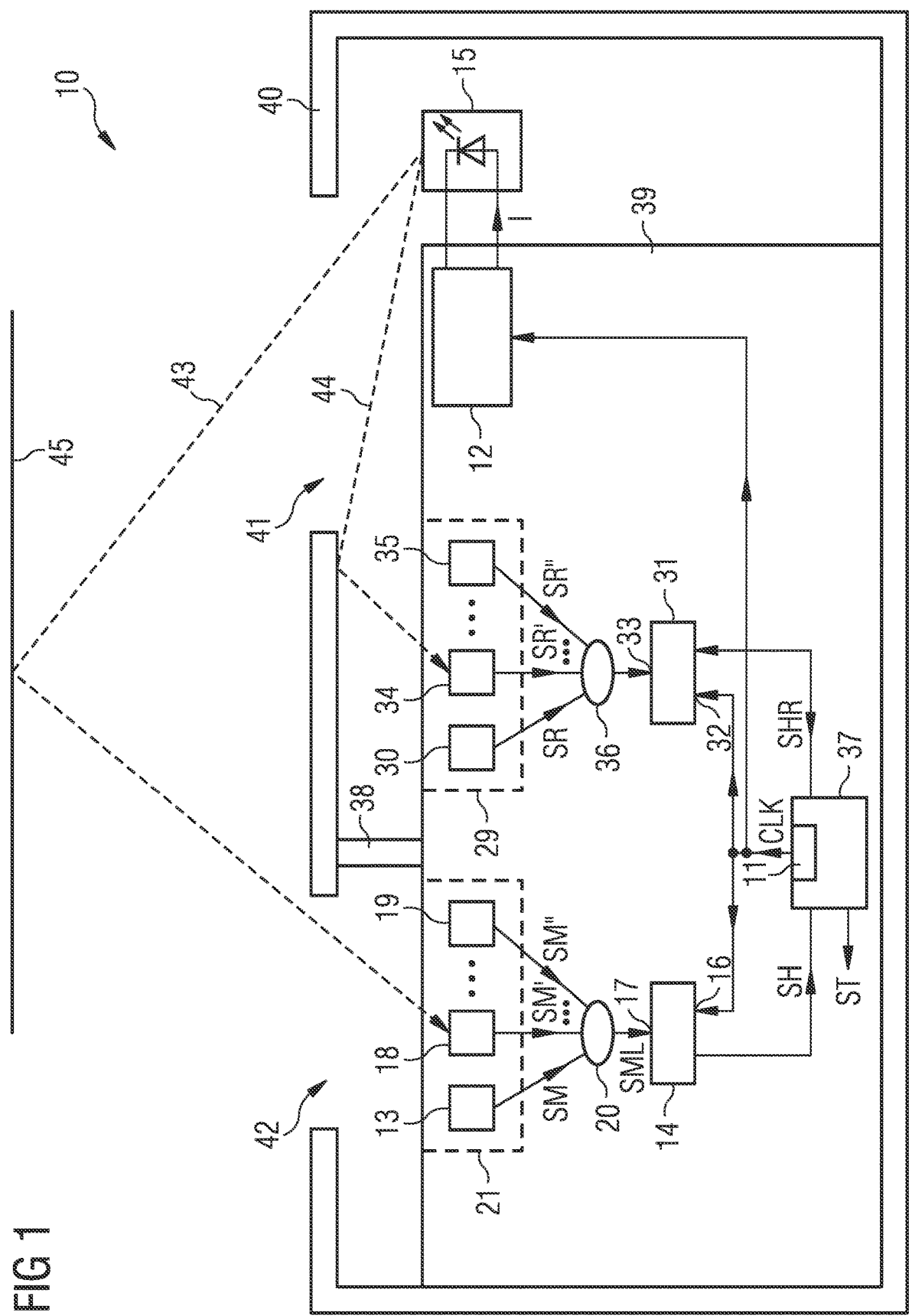
FIG. 1 shows an example implementation of a TOF arrangement.

FIG. 1 shows an example implementation of a TOF arrangement 10 which comprises a clock generator 11, a laser driver 12, a measurement photodiode circuit 13 and a time-to-digital converter 14, abbreviated as converter, TDC, measurement TDC or measurement pixel TDC. An output of the clock generator 11 is connected to an input of the laser driver 12. Moreover, the TOF arrangement 10 may comprise a laser 15. The laser 15 is connected to the laser driver 12. The laser 15 comprises a first and a second terminal, each of the terminals is connected to terminals of the laser driver 12. The laser 15 may be realized as a laser diode. The laser 15 may be fabricated as a vertical-cavity surface-emitting laser, shorted as VCSEL, or a vertical-external-cavity surface-emitting-laser, shorted as VECSEL.

The TDC 14 comprises a start input 16 and a first stop input 17. An output of the measurement photodiode circuit 13 is coupled to the first stop input 17 of the TDC 14. The output of the clock generator 11 is connected to the start input 16 of the TDC 14. The TOF arrangement 10 may comprise further measurement photodiode circuits 18, 19. The further measurement photodiode circuits 18, 19 may be realized such as the measurement photodiode circuit 13. Each of the measurement photodiode circuits 13, 18, 19 comprises a not shown avalanche photodiode. The measurement photodiode circuits 13, 18, 19 may be realized e.g. as shown in FIG. 3B. The measurement photodiode circuits 13, 18, 19 form a measurement sensor 21. The measurement sensor 21 can be realized as a measurement array or measurement SPAD array. Thus, the TOF arrangement 10 comprises a first number N of measurement photodiode circuits 13, 18, 19. The first number N of measurement photodiode circuits may be realized as an array, such as a 1·N array or an N·M array.

Additionally, the TOF arrangement 10 comprises a measurement readout logic 20. Outputs of the measurement photodiode circuits 13, 18, 19 are coupled to inputs of the measurement readout logic 20. An output of the measurement readout logic 20 is coupled to the first stop input 17 of the TDC 14. The measurement readout logic 20 may be implemented as an OR gate. The measurement readout logic 20 may realize an OR combination of the measurement readout signals SM, SM', SM" provided by the measurement photodiode circuits 13, 18, 19.

The TOF arrangement 10 comprises a reference photodiode circuit 30 and a reference time-to-digital converter 31, abbreviated reference converter or reference TDC. The reference TDC 31 has a start input 32 and a stop input 33. The output of the clock generator 11 is connected to the start input 32 of the reference TDC 31. The reference photodiode circuit 30 has an output coupled to the stop input 33 of the reference TDC 31 The TOF arrangement 10 may comprise further reference photodiode circuits 34, 35 and a reference readout logic 36. A reference sensor 29 comprises the reference photodiode circuits 30, 34, 35. The reference sensor 29 can be realized as reference array or reference SPAD array. The outputs of the reference photodiode circuits 30, 34, 35 are coupled via the reference readout logic 36 to the stop input 33 of the reference TDC 31. The reference photodiode circuits 30, 34, 35 are realized such as the measurement photodiode circuit 13. The TOF arrangement 10 comprises an evaluation circuit 37 that may be realized as a digital evaluation circuit, core, digital core, microprocessor, microcontroller or state machine. The clock generator 11 is connected to the evaluation circuit 37.

The TOF arrangement 10 comprises a barrier 38 that is arranged on top of a semiconductor body 39. The barrier 38 is an optical barrier. The barrier 38 is impervious to light. The semiconductor body 39 comprises at least the clock generator 11, the measurement photodiode circuit 13, the laser driver 12, the TDC 14, the measurement readout logic 20 and the evaluation circuit 37. The semiconductor body 39 may comprise a silicon substrate.

The barrier 38 is arranged on top of the surface of the semiconductor body 39 and optically separates the measurement photodiode circuits 13, 18, 19 from the reference photodiode circuits 30 34 35. The laser 15 may be realized on a further semiconductor body that is separate from the semiconductor body 39. The laser 15 is connected to the semiconductor body 39. The laser 15 may be located at a side of the semiconductor body 39 or (not shown) on top of the semiconductor body 39.

The TOF arrangement 10 comprises a housing 40 having a first and a second opening 41, 42. The laser 15 emits light through the first opening of the housing 40. This light is reflected by a target 45. The reflected light may be absorbed by a photodiode of one of the photodiode circuits 13, 18, 19 resulting in the measurement readout signal SM of one of the measurement photodiode circuits 13, 18, 19.

In FIG. 1, an optical measurement path 43 and an optical reference path 44 are shown. The optical measurement path 41 originates at the laser 15 and runs through the first opening 41 to the target 45 and then from the target 45 through the second opening 42 to one of the measurement photodiode circuits 13, 18, 19. The optical reference path 44 also originates from the laser 15 and extends inside the housing 40 to the reference photodiode circuits 30, 34, 35. Thus, the optical reference path 44 remains inside of the housing 40.

The clock generator 11 generates a clock signal CLK. The clock signal CLK is provided to the input of the laser driver 12. The laser driver 12 can also be named "laser driver plus optical emitter". The laser driver 12 provides a current I to the laser 15 as a function of the clock signal CLK. A step in the clock signal CLK triggers the generation of the laser current I and thus the emission of the photons by the laser 15. The clock signal CLK is also provided to the start input 16 of the TDC 14. Additionally, the clock signal CLK is provided to the start input 32 of the reference TDC 31.

The measurement photodiode circuit 13 generates the measurement readout signal SM, when a photon hits the photodiode of the measurement photodiode circuit 13. The measurement readout signal SM is provided to the first stop input 17 of the TDC 14. Correspondingly, the further measurement photodiode circuits 18, 19 generate further measurement readout signals SM', SM", when a photon hits one of the further photodiode circuits 18, 19. The measurement readout signals SM, SM', SM" are combined by the measurement readout logic 20 into a measurement readout logic signal SML that is provided to the first stop input 17 of the TDC 14.

Similarly, the reference photodiode circuit 30 generates a reference readout signal SR, when a photon hits the photodiode of the reference photodiode circuit 30. The further reference photodiode circuits 34, 35 generate further reference readout signals SR', SR", when a photon hits one of the further photodiode circuits 34, 35. The reference readout signals SR, SR', SR" are combined by the reference readout logic 36 into a reference readout logic signal SRL for providing to the stop input 33 of the reference TDC 31.

The TDC 14 provides a histogram signal SH on its output side. The histogram signal SH comprises the information about the histogram determined by the TDC 14. The reference TDC 31 provides a reference histogram signal SHR comprising a reference histogram generated by the reference TDC 31. The sequence of signals with their durations and delays is explained in FIG. 2.

In an alternative, not shown embodiment, the first terminal of the laser 15 is connected to a terminal of the laser driver 12 and the second terminal of the laser 15 is connected to a reference potential terminal or to a supply voltage terminal.

FIG. 2 shows the sequence of signals that are generated in the TOF arrangement 10 as shown in FIG. 1. In FIG. 2, a sketch shows the delays of the signal traveling from the clock source to the measurement and reference pixel 13, 30.

The signals are shown as a function of a time t. In line A, the propagation delays from the clock source to the generation of a stop pulse at the first stop input 17 of the TDC 14 (which is a measurement pixel TDC) is shown. The TDC 14 may also be named time-measurement circuit. The clock source may be realized by the clock generator. Alternatively, the clock source may be a circuit (not shown in FIG. 1) coupled on its input side to the output of the clock generator 11 and on the output side to the start input 16 of the TDC 14 and the start input 32 of the reference TDC 31.

Line B shows the propagation delays from the clock generator 11 to the generation of a start pulse at the start input 16 of the TDC 14. Line C shows the propagation delays from the clock source to the generation of a stop pulse at the stop input 33 of the reference TDC 31 which can be named reference pixel TDC. Line D shows the propagation delays from the clock generator 11 to the generation of a start pulse at the start input 32 of the reference TDC 31.

Figure 17:
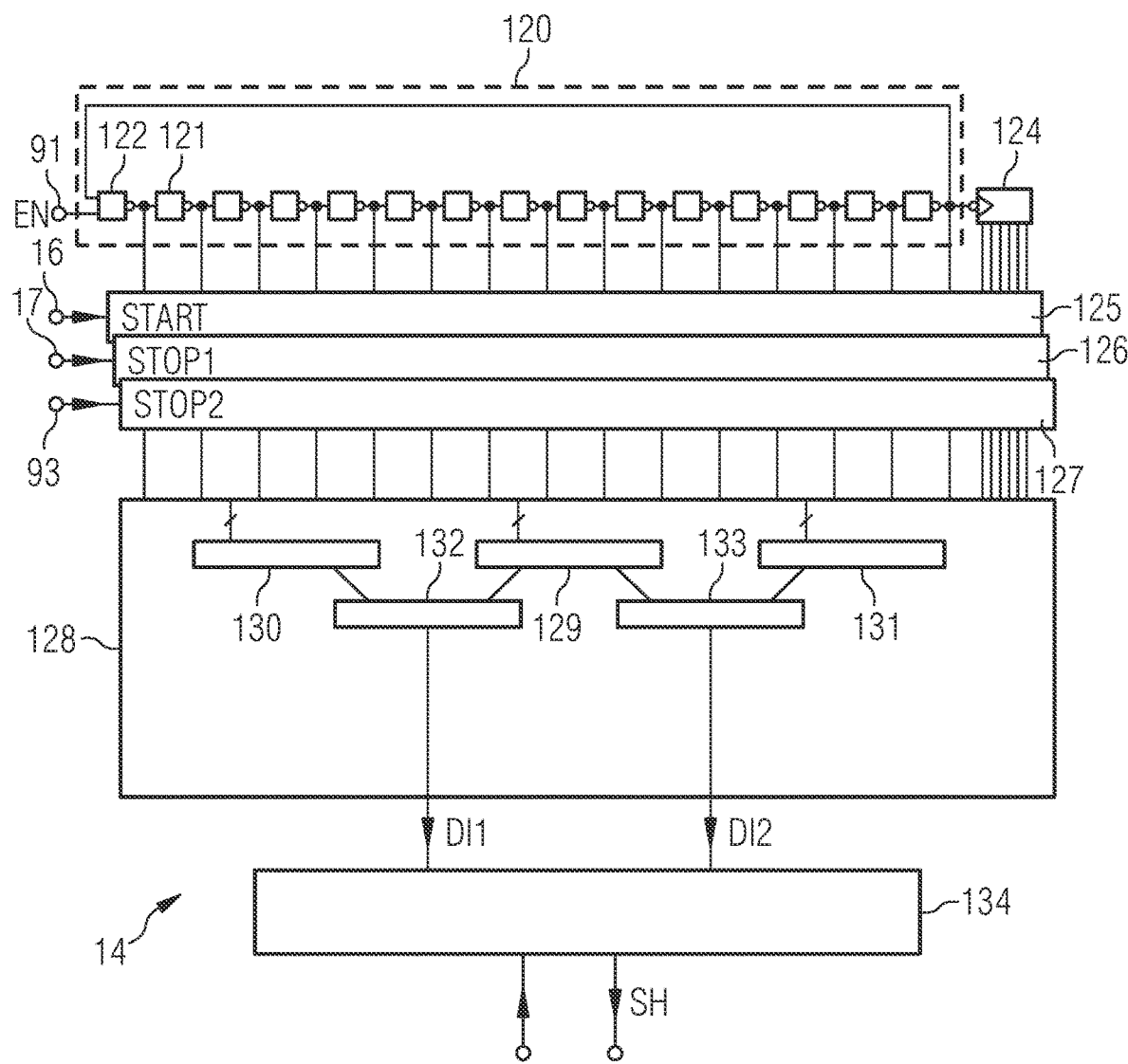
FIG. 17 shows an example implementation of a time-to-digital converter.

The signals start at a first point of time t1. It can be assumed that a delay D1 between the output of the clock generator 11 and the start input 16 of the TDC 14 is equal to a delay D1 between the output of the clock generator 11 and the start input 32 of the reference TDC 31. The delay D1 is between the first point of time t1 and a second point of time t2, at which the pulse of the clock signal CLK arrives at the start input 16 of the TDC 14 and at the start input 32 of the reference TDC 31. Thus, at the second point of time t2, the states of elements of a ring oscillator of the TDC 14 and a counter value of a counter of the TDC 14 are stored in a first latch of the TDC 14 and the states of the elements of a ring oscillator of the reference TDC 31 and a counter value of a counter of the reference TDC 31 are stored in a first latch of the reference TDC 31. Said elements of the ring oscillator are a logic element and a plurality of inverting elements as shown in FIG. 17. Thus, the second point of time t2 is a start time of the measurement of the measurement TDC 14 and the reference TDC 31. At the second point of time t2, the ring oscillator of the TDC 14 and the ring oscillator of the reference TDC 31 are already oscillating.

As shown in lines A and C, at a third point of time t3, the clock signal generated from the clock source arrives at the laser driver 12 with a delay L1. At a fourth point of time t4, a photon or photons is/are emitted by the laser 15. Thus, there is a delay L2 between the fourth point of time t4 and the third point of time t3 originating from the operation of the laser driver 12 and the laser 15. As shown in line A, the photon runs a time-of-flight TOF on the optical measurement path 43 between the laser 15 and the measurement photodiode circuit 13, until the photon is detected at the measurement photodiode circuit 13 at the fifth point of time t5. Contrary to that in line C the distance between the laser 15 and one of the reference photodiode circuits 30, 34, 35 is so small that no delay exists between the emission of the photon by the laser 15 and the absorption of the photon by one of the reference photodiode circuits 30, 34, 35.

As shown in line A, there is a delay L3 between the fifth point of time t5 and a seventh point of time t7 originating from the response time of the measurement photodiode circuit 13 and the measurement readout logic 20. The delay L3 may be named readout delay. Thus, at the seventh point of time t7, the TDC 14 receives a stop signal. The seventh point of time t7 is the stop time of measurement of the TDC 14. Correspondingly, in line C there is a readout delay L3 between the fourth point of time t4 and a sixth point of time t6 at which the reference TDC 31 receives the stop signal. Thus, the sixth point of time t6 is the stop time of the measurement of the reference TDC 31.

The histogram signal SH provided by the TDC 14 provides the information about the duration R1 between the seventh point of time t7 and the second point of time t2. The duration R1 is equal to the sum of the durations L2, TOF and L3. The reference histogram signal SHR of the reference TDC 31 comprises the information about the duration R2 between the sixth point of time t6 and the second point of time t2. This duration R2 is equal to the sum of the delay L2 and readout delay L3.

The histogram signal SH and the reference histogram signal SHR are provided to the evaluation circuit 37. The evaluation circuit 37 generates a time-of-flight signal ST representing the time-of-flight TOF that comprises the differences between the fifth point of time t5 and the fourth point of time t4. The TDC 14 has run during the duration R1. Correspondingly, the reference TDC 31 has run during the duration R2. Thus, the evaluation circuit 37 calculates the time-of-flight TOF according to the following equation:
TOF=R1−R2

In FIG. 2, the propagation delays of the signal during a measurement sequence is shown. The clock signal CLK is provided by the reference clock generator 11 and propagates through not-shown logic cells of the clock tree and interface connection to the laser driver 12 with the delay L1, also named delay_core_to_laser_driver. The same clock signal CLK is connected to the start input 16 of the TDC 14 representing the start pulse with the delay D1, also named delay_core_to_measurement_TDC. At this second point in time t2, the TDC measurement starts. At the laser driver 12, an additional propagation delay needs to be added until the clock signal CLK has propagated through the laser driver 12 and starts to drive the current I through the laser 15. Finally, the laser 15 requires a certain time period to generate photons. These delays are summarized in FIG. 2 by the delay L2, also named delay_clock_to_light. As the photons are emitted by that point in time, their travel time from the laser to the target 45 and from the target 45 back to the measurement sensor 21 introduces additional delay that is the time-of-flight TOF.

The reflected photons trigger the measurement sensor 21 which generates the electrical readout signal SM that has to propagate through the readout circuit and the measurement readout logic 20 to reach the first stop input 17 of the TDC 14 requiring the readout delay L3, also named delay_sensor_to_measurement_TDC. The overall signal delay of the TDC start signal can therefore be summarized as:

$$delay_{start\_pulse_M} = delay_{core\_to\_measurement\_TDC} = D1$$

$$delay_{stop\_pulse_M} = delay_{core\_to\_laser\_driver} + delay_{clock\_to\_light} +$$
$$TOF + delay_{sensor\_to\_measurement\_TDC} = L1 + L2 + TOF + L3$$

$$result_{measurement\_TDC} = delay_{stop\_pulse_M} - delay_{start\_pulse_M} =$$
$$L1 + L2 + TOF + L3 - D1$$

In the equations above the propagation delays L1, L2, L3 and D1 represent parameters which are sensitive to process, voltage and temperature variation, abbreviated PVT, and therefore introduce a measurement error. To overcome this, a reference channel located in the cavity of the laser 15 is typically used. This reference sensor 29 is a replica of the measurement sensor 21 and therefore shows exactly the same architecture.

On the reference side, the same delays L1+L2 (named delay_core_to_laser_driver+delay_clock_to_light) occurs from the clock generator 11 to the fourth point in time t4 of light emission as well as the delay D1 from the clock generator 11 to the start input of the reference TDC 31, named delay_core_to_reference_TDC that is equal to delay_core_to_measurement_TDC.

The time-of-flight to the reference signal is negligible as the reference sensor 29 is located in the same cavity as the laser 15. Therefore, only the readout delay L3, named delay_sensor_to_reference_TDC, needs to be added until the signal reaches the stop input 33 of the reference TDC 31.

$$delay_{start\_pulse_R} = delay_{core\_to\_reference\_TDC} = D1$$

$$delay_{stop\_pulse_R} =$$
$$delay_{core\_to\_laser\_driver} + delay_{clock\_to\_light} + delay_{sensor\_to\_reference\_TDC} =$$
$$L1 + L2 + L3$$

$$result_{reference\_TDC} = delay_{stop\_pulse_R} - delay_{start\_pulse_R} = L1 + L2 + L3 - D1$$

Subtracting the measurement result on the measurement and reference side gives:

$$result_{measurement\_TDC} - result_{reference\_TDC} = L1 + L2 + TOF + L3 - (L1+L2+L3) = TOF$$

Thus, the result calculated by the evaluation circuit 37 and provided as the time-of-flight signal ST is equal to the value of the time-of-flight TOF or represents the time-of-flight TOF. According to this approach, all PVT sensitive delays drop out of the above shown equation, resulting in an accurate measurement result.

In the following disclosure, the technique to overcome the need for a reference sensor 29 in the same cavity as the laser 15 by measuring the propagation delays L2 of photon generation (L2=clock_to_light) and readout delay L3 (L3=sensor_to_TDC) during a calibration sequence is shown.

In an alternative embodiment, the TDC 14 and the reference TDC 31 start oscillating at the second point of time t2.

FIG. 3A shows an example implementation of a photodiode circuit 50 that can be used in the TOF arrangement 10 of FIG. 1. The photodiode circuit 50 may be implemented as a calibration photodiode circuit. The photodiode circuit 50 comprises an avalanche photodiode 51, a quenching circuit 52, a diode node 53 and a readout circuit 54 with a first and a second output 48, 49. The quenching circuit 52 is coupled via the diode node 53 to the avalanche photodiode 51. The photodiode circuit 50 comprises a reference potential terminal 55 and a sensor supply terminal 56. The quenching circuit 52 is arranged between the diode node 53 and the reference potential terminal 55. The avalanche photodiode 51 is arranged between the sensor supply terminal 56 and the diode node 53. The sensor supply terminal 56 may be named high voltage sensor supply terminal. The anode of the avalanche photodiode 51 is connected to the diode node 53 and the cathode of the avalanche photodiode 51 is connected to the sensor supply terminal 56. The avalanche photodiode 51 may be realized as a single photon avalanche photodiode, abbreviated as SPAD. An input of the readout circuit 54 is connected to the diode node 53.

The readout circuit 54 comprises a readout buffer 57 connected on its input side to the diode node 53. An output of the readout buffer 57 is connected via the first output 48 of the readout circuit 54 to an input of a readout logic 62 of the TOF arrangement 10. An output of the readout logic 62 is connected to the TDC 14, for example to the first stop input 17 of the TDC 14. Additionally, the readout circuit 54 comprises a sense buffer 58 that has an input connected to the diode node 53. An output of the sense buffer 58 is connected via the second output 49 of the readout circuit 54 to the input side of the TDC 14, e.g. to the start input 16. The sense buffer 58 is realized as a fast buffer. The sense buffer 58 can also be named trigger sense buffer.

The photodiode circuit 50 may comprise an enable switch 59 and a supply terminal 60. The enable switch 59 is arranged between the supply terminal 60 and the diode node 53. The supply terminal 60 may also be named chip supply terminal. The photodiode circuit 50 may comprise a trigger input 61 that is connected to a control terminal of the enable switch 59. In the mode of operation shown in FIG. 3A, the enable switch 59 is set in a non-conducting state. Thus, the trigger input 61 and the enable switch 59 are not used and are optional.

During operation a high sensor supply voltage VHS is applied to the sensor terminal 56. A diode node voltage VAN drops across the quenching circuit 52. The diode node voltage VAN may be named SPAD anode voltage. The sensor supply voltage VHS mainly drops across the avalanche photodiode 51 and the diode node voltage VAN at the diode node 53 is approximately zero in case of absence of photons. There is no signal at the trigger input 61. The signals are shown in the lower part of FIG. 3A.

At the point of time when a photon hits the avalanche photodiode 51, a high current starts to flow through the avalanche photodiode 51 resulting in a rise of the diode node voltage VAN. The readout circuit 54 detects the rise of the diode node voltage VAN. The sense buffer 58 generates a trigger sense signal STS in a pulse form. Correspondingly, the readout buffer 57 generates a readout signal SP also in the form of a pulse. At the output of the readout logic 62, a readout logic signal SPL can be tapped. Since there are several circuits in the readout logic 62, the readout logic signal SPL has the readout delay L3 with respect to the readout signal SP. In case the trigger sense signal STS is provided to the start input 16 of the TDC 14 and the readout logic signal SPL is provided to the first stop input 17 of the TDC 14, the readout delay L3 can be measured.

The avalanche photodiode 51 may be operated in a single photon avalanche photodiode mode. In the measurement phase, the avalanche photodiode 51 may receive the sensor supply voltage VHS with such a high value that a single photon may be able to trigger the avalanche photodiode 51.

In FIG. 3A, a SPAD with the quenching circuit 52 is shown. The avalanche photodiode 51 is triggered by a photon. The quenching circuit 52 may comprises at least one of a resistor and a transistor. The transistor may be operated as a resistor. The quenching circuit 52 converts the current through the avalanche photodiode 51 to the diode node voltage VAN. An analog-to-digital conversion is performed by the readout buffer 57.

The SPAD cell of FIG. 3A consists of or comprises the photosensitive SPAD sensor 51, the quenching resistor 52 and the readout buffer 57. The enable switch 59 can be used to disable the SPAD 51 by forcing the SPAD anode potential to the chip supply VS and therefore defines the voltage across the SPAD 51 to be smaller than the breakdown voltage. This enable switch 59 is off during operation. In FIG. 3A, no external trigger signal is used during a calibration phase. Therefore, a trigger event of the SPAD 51 due to a photon or dark count is needed for calibration. In case of an event, the signal is detected by the fast sense buffer 58 which is connected to the input side of the TDC 14, e.g. to the start input 16. In parallel, the signal propagates through the readout buffer 57 and the readout logic 63 to the input side of the TDC 14, e.g. to the first stop input 17. The difference in time TDC stop-TDC start represents the readout delay L3, also named delay_sensor_to_TDC. The start signal which may be asynchronous is generated by the SPAD 51. Therefore, a measurement time has to be set according to the trigger repetition rate.

FIG. 3B shows an alternative example implementation of the photodiode circuit 50 that is a further development of the implementation shown in FIG. 3A. Here a supply voltage VS is supplied to the supply terminal 60. A trigger signal TI is provided via the trigger input 61 to the control terminal of the enable switch 59. The photodiode circuit 50 is electrically triggered. Thus, the trigger signal TI can also be named electrical trigger signal. The trigger signal TI has the form of a pulse. Thus, the diode node voltage VAN rises after closing of the enable switch 59. The rise of the diode node voltage VAN results in a pulse in the sense signal STS and a pulse in the readout signal SP and consequently also in a pulse of the readout logic signal SPL. The sensor supply voltage VHS may obtain a lower value such that the avalanche photodiode 51 does not trigger in the case that a photon hits the avalanche photodiode 51. Thus, it is avoided that the photodiode circuit 50 emits pulses in the case that a photon hits the avalanche photodiode 51. The pulses in the sense signal STS and in the readout signal SP are only provided as a response to a pulse in the trigger signal TI.

In FIG. 3B, a SPAD is shown with the quenching circuit 52 triggered by the electrical trigger signal TI using the enable switch 59 connected to the power supply VS. The enable switch 59 is used to electrically trigger the SPAD anode. In the calibration phase, the voltage at the SPAD cathode is regulated to be below the breakdown voltage in order to prevent the avalanche photodiode 51 from being triggered by a photon. In parallel to the readout path, the fast sense buffer 58 is implemented to indicate the start of the calibration signal. The rise time of the rising edge of the diode node voltage VAN depends on the on-resistance of the enable switch 59, which introduces a small error in the measurement. The trigger signal TI may be synchronous to the system clock signal CLK.

In an alternative embodiment, not shown in FIGS. 3A and 3B, the readout buffer 57 also generates the trigger sense signal STS. The second output 49 may be connected to the first output 48. Thus, the trigger sense signal STS may be identical with the readout signal SP. The sense buffer 58 may be omitted. This embodiment may be used in different examples of the TOF arrangement such as e.g. shown in FIGS. 5 and 6.

FIG. 3C shows a further example implementation of the photodiode circuit 50 that is a further development of the implementations shown in FIGS. 3A and 3B. The photodiode circuit 50 is free of the enable switch 59 and the supply terminal 60. The readout circuit 54 comprises a readout gate 63 having a first input connected to the diode node 53. A second input of the readout gate 63 is connected to the trigger input 61. The readout gate 63 generates the readout signal SP at the first output 48 of the readout circuit 54. The trigger input 61 is connected to the second output 49 of the readout circuit 54. The trigger signal TI is directly provided at the second output 49 of the readout circuit 54. Thus, the trigger sense signal STS is equal to the trigger signal TI. As shown in the lower part of FIG. 3C, the diode node voltage VAN remains at 0 V. The readout gate 63 may have the function of an OR gate. When a pulse of the trigger signal TI is provided to one of the inputs of the readout gate 63, the readout gate 63 generates the readout signal SP in the form of a pulse.

In FIG. 3C, the SPAD is shown with the quenching circuit 52 using the readout gate 63 as readout buffer. The readout gate 63 is designed as an OR-gate. The electrical trigger signal TI can be applied via the readout gate 63. The readout buffer 57 shown in FIGS. 3A and 3B is represented by the readout gate 63 which allows to trigger from the avalanche photodiode 51 or by the trigger signal TI. The readout gate 63 is implemented such that the propagation delay from both inputs to the output of the readout gate 63 is made equal. FIGS. 3B and 3C show two different options to introduce an electrical trigger signal TI during calibration.

The photodiode circuit 50 shown in FIGS. 3A to 3C are realized such that it is configured to provide a trigger sense signal STS in case a fast detection of a pulse is required. Moreover, the readout signal SP can be combined with further readout signals SP', SP" of other photodetector circuits by the readout logic 62.

The measurement photodiode circuits 13, 18, 19 shown in FIG. 1 may be implemented such as the photodiode circuit 50 shown in FIGS. 3A to 3C. Also the reference photodiode circuits 30, 34, 35 shown in FIG. 1 may be realized such as the photodiode circuit 50 shown in FIGS. 3A to 3C. For the realization of the measurement photodiode circuits 13, 18, 19 and the reference photodiode circuits 30, 34, 35, the enable switch 59, the supply terminal 60, the trigger input 61, the sense buffer 58 and the second output 49 may be omitted. Thus, the measurement photodiode circuits 13, 18, 19 and the reference photodiode circuits 30, 34, 35 comprise the avalanche photodiode 51, the quenching circuit 52, the readout circuit 54 with the readout buffer 57, the diode node 53, the sensor supply terminal 56 and the reference potential terminal 55. In case the photodiode circuit 50 shown in FIG. 3C is used as a measurement photodiode circuit or a reference photodiode circuit, the second input of the readout gate 63 may be connected e.g. to the reference potential terminal 55. Thus, the diode node voltage VAN rises due to a trigger event of the avalanche photodiode 51 and the readout gate 63 generates a readout signal SP in the form of a pulse.

FIG. 4 shows an example implementation of the readout logic 62 which is a further development of the embodiments shown in FIGS. 1 and 3A to 3C. The measurement readout logic 20 and the reference readout logic 36 can be realized such as the readout logic 62. The readout logic 62 realizes an OR combination of the number N of photodiode circuits 50, 64 to 70. The readout logic 62 can be realized as an N-to-1 OR gate. FIG. 4 shows an example of an 8-to-1 OR gate. Thus, the first number N of photodiode circuits 50, 64 to 70 are each connected on the output sides to inputs of the readout logic 62. The readout logic 62 comprises one output and is connected to the input side of the TDC 14, e.g. to the first stop input 17 of the TDC 14. The readout logic 62 comprises at least one of an NAND gate or a NOR gate. Moreover, the readout logic 62 may comprise at least one inverter. The readout logic 62 may have a symmetric structure. The readout logic 62 realizes equal propagation delays between each of the first number N of photodiode circuits 50, 64 to 70 and the output of the readout logic 62.

The readout logic 62 comprises eight inverters 71 to 78 that are connected on their input sides to the first number N of photodiode circuits 50, 64 to 70. The readout logic 62 comprises four NAND gates 79 to 82. A first NAND gate 79 is connected on the input side to the outputs of a first and a second inverter 71, 72. Thus, the four NAND gates 79 to 82 are connected on their input sides to the outputs of the eight inverters 71 to 78. Moreover, the readout logic 62 comprises a first and a second NOR gate 83, 84. The first NOR gate 83 is connected on its input side to the outputs of the first and a second NAND gate 79, 80. Correspondingly, the second NOR gate 84 is connected on its input side to the outputs of a third and a fourth NAND gate 81, 82. Additionally, the readout logic 62 comprises a fifth NAND gate 85 connected on its output side to the output of the readout logic 62. The fifth NAND gate is connected on its input side to the outputs of the first and the second NOR gate 83, 84.

In case the readout signal SP of each of the first number N of photodiode circuits 50, 64 to 70 has the value zero (that means that there is no pulse in the readout signals SP), then the readout logic signal SPL at the output of the readout logic 62 also has the value zero. In case at least one of the first number of photodiode circuits 50, 64 to 70 has a readout signal SP with the value 1, then the readout logic signal SPL obtains the values 1. Therefore, the measurement is not disturbed in the case of a high amount of photons absorbed by the photodiode circuits 50, 64 to 70. The readout logic 62 is configured such that the delays between one of the inputs of the readout logic 62 to the output of the readout logic circuit 62 are equal.

The readout logic 62 acts as an N-to-1 OR gate, e.g. as 8-to-1 OR gate, to merge the signal from multiple SPADs such as N detectors to a single bus line. The output of the readout logic 62 is connected to the input side of the TDC 14. As the propagation delay through the chain of gates is highly PVT (Process, Voltage and Temperature) dependent, it needs to be considered in the time measurement procedure. The readout logic 62 combines the output signals of N detectors to a single bus line connected to a TDC channel.

Figure 5:
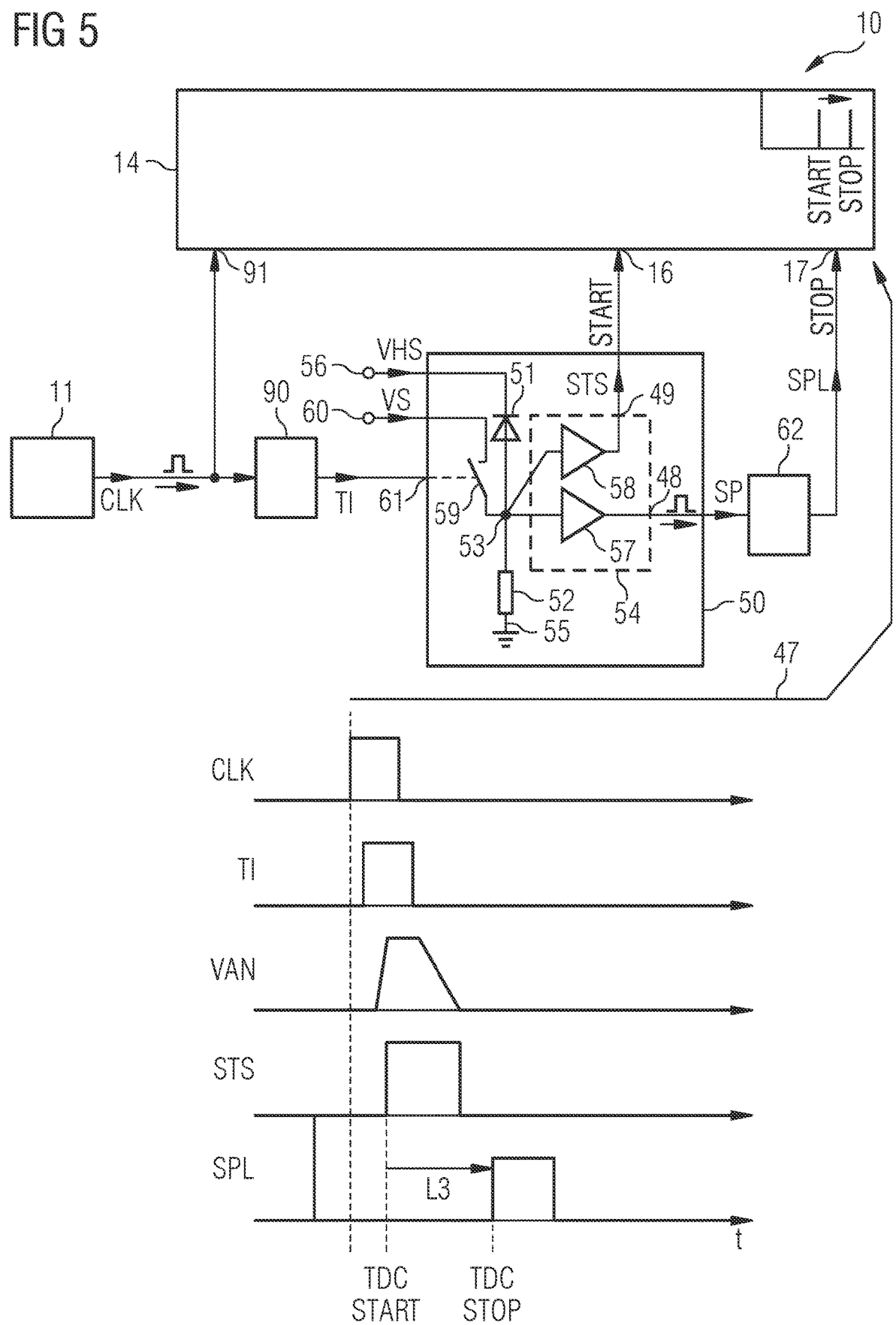

FIG. 5 shows an example implementation of the TOF arrangement 10 that is a further development of the above-shown embodiments. The TOF arrangement 10 comprises the clock generator 11, the TDC 14, the readout logic 62 and the photodiode circuit 50 as shown in FIGS. 3A to 3C. Moreover, the TOF arrangement 10 comprises a coupling circuit 90 that is coupled on its input side to the output of the clock generator 11 and on its output side to the trigger input 61. The coupling circuit 90 can be implemented as a digital logic and/or a level shifter. The clock generator 11 is connected on its output side to a further input 91 of the TDC 14 which may be an enable input of the TDC 14. The readout circuit 54 is coupled on its output side to the start input 16 and to the first stop input 17 of the TDC 14. More precisely, the first output 48 of the readout circuit 54 is coupled via the readout logic 62 to the first stop input 17 of the TDC 14. The second output 49 of the readout logic 54 is connected to the start input 16 of the TDC 14. An electrical calibration path 47 comprises the photodiode circuit 50 and the readout logic 62.

In the lower part of FIG. 5 the signals are shown as a function of the time t. The clock generator 11 generates the clock CLK that is provided to the further input 91 of the TDC 14. Thus, a ring oscillator of the TDC 14 (shown in FIG. 17) starts oscillating. Alternatively, the ring oscillator already oscillates at the rise of the clock signal CLK. The clock signal CLK is also provided to the coupling circuit 90 that generates the trigger signal TI and provides it to the trigger input 61. The trigger signal TI can also be named as further clock signal. The trigger signal TI may have a lower maximum value in comparison to the clock signal CLK. The trigger signal TI is appropriate for the control of the enable switch 59.

When the trigger signal TI is applied to the photodiode circuit 50, the diode node voltage VAN starts to rise and the trigger sense signal STS is provided at the second output 49 of the readout circuit 54 and applied to the start input 16 of the TDC 14. The signal at the start input 16, such as e.g. the trigger sense signal STS, triggers the storage of the states of the elements of the ring oscillator and the counter value in the first latch. Simultaneously, at the first output 48 of the readout circuit 54 a pulse is provided that is applied to the readout logic 62 and thus generates the readout logic signal SPL at the output of the readout logic 62. The rising edge of the readout logic signal SPL has the readout delay L3 with respect to the rising edge of the trigger sense signal STS. The readout delay L3 is measured by the TDC 14 in the calibration phase and may be used in a following measurement phase.

In FIG. 5, a measurement of the readout delay L3 is shown using a two-channel TDC 14. In this case, the START signal is generated by the small sense buffer 58 and the STOP signal is generated at the output of the SPAD readout circuitry namely at the output of the readout logic 62. Therefore, no double-differential measurement is used. The readout delay L3 is determined by L3=TDC STOP−TDC START.

Thus, the TOF arrangement 10 is configured for a calibration measurement of the readout logic 62. The electrical trigger signal TI is applied to the sensor cell 50 and has to propagate through digital logic cell such as the level shifter 90 and forces a rising edge at the SPAD anode VAN using the enable switch 59. The clock edge is sensed using a small sense buffer 58 which is directly connected to the TDC 14 and represents the starting point in time of the readout. In parallel the signal propagates through the readout logic 62 and arrives at the second TDC input, namely the first stop input 17. The difference in time between the two signals represents the readout delay L3.

FIG. 6 shows a further example implementation of the TOF arrangement 10 that is a further development of the above-shown embodiments. The TDC 14 comprises a second stop input 93. The output of the clock generator 11 is directly connected to the start input 16 of the TDC 14. The first output 48 of the readout circuit 54 is coupled via the readout logic 62 to the second stop input 93 of the TDC 14. The second output 49 of the readout circuit 54 is connected to the first stop input 17 of the TDC 14.

The clock signal CLK is provided to the start input 16 of the TDC 14. The coupling circuit 90 generates the trigger signal TI as a function of the clock signal CLK. The diode node voltage VAN rises as a result of the trigger signal TI. The trigger sense signal STS generated at the second output 49 of the readout circuit 54 is provided to the first stop input 17. The pulse generated at the first output 48 of the readout circuit 54 is delayed by the readout logic 62 and arrives at the second stop input 93 of the TDC 14. The TDC 14 calculates a value of the readout delay L3.

In the calibration phase, the clock generator 11 generates a series of M pulses resulting in M values of the readout delay L3 that are stored in the form of a histogram. Thus, the embodiments of the TOF arrangement 10 shown in FIGS. 5 and 6 are configured to measure the readout delay L3 that is caused by the readout logic 62.

Measuring SPAD readout delay: The architecture of the calibration measurement of the readout logic 62 is shown in FIG. 6. An electrical trigger signal TI is generated by the clock generator 11 and triggers the START input of the TDC 14. In the addition the signal is applied to the sensor cell 50 and has to propagate first through digital logic cells 90 such as the level shifter until it reaches the sensor 50 and forces a rising edge at the SPAD anode VAN using the enable switch 59. The clock edge is sensed using a small sense buffer 58 which is directly connected to the first stop input 17 of the TDC 14 (STOP 1). It represents the first timestamp of the readout indicating the point in time when the signal starts to propagate through the readout circuitry. In parallel the signal propagates through the readout logic 62 and arrives at the second input 93 of the TDC 14 (TDC STOP2). The difference in time between STOP1 and STOP2 represents the readout delay L3: L3=TDC STOP2−TDC STOP1. This procedure allows to measure the actual delay_sensor_to_TDC at a certain process corner or temperature during the calibration phase. The result can be used for compensation during the distance measurement.

This measurement procedure can be realized as well using a double differential measurement as explained above:

$$L3 = \text{TDC STOP2} - \text{TDC START} - (\text{TDC STOP1} - \text{TDC START})$$

FIG. 7 shows a further example implementation of the TOF arrangement 10 that is a further development of the above-shown embodiments. The laser driver 12 is coupled to the laser 15 by a current sensor 95 of the TOF arrangement 10. A terminal of the laser driver 12 is connected to the first terminal of the laser 15 via the current sensor 95. A further terminal of the laser driver 12 is connected to the second terminal of the laser 15. An output of the current sensor 95 is coupled to the first stop input 17 of the TDC 14. The current sensor 95 provides a current sense signal ISE as a function of the current I flowing through the laser 15.

The TOF arrangement 10 comprises a sensor buffer 96 connected to the output of the current sensor 95. The sensor buffer 96 is arranged between the output of the current sensor 95 and the first stop input 17 of the TDC 14. The sensor buffer 96 may be realized as a comparator. The sensor buffer 96 compares the current sense signal ISE with a threshold value. The output of the clock generator 11 is connected to the start input 16 of the TDC 14.

Thus, a pulse of the clock signal CLK is provided to the start input 16. The pulse of the clock signal CLK is also provided to the laser driver 12 that generates the current I that is applied to the laser 15 such that the laser 15 emits a pulse of light. The current sense signal ISE that may be an analog signal. Due to the operation of the laser driver 12 and of the laser 15, the current sense signal ISE has the delay L1+L2 in comparison to the pulse of the clock signal CLK. The sensor buffer 96 converts the current sense signal ISE into a pulse that is provided to the first stop input 17 of the TDC 14. At the point of time of receiving the pulse at the first stop input 17, the TDC 14 calculates the time difference between the pulses at the start input 16 and the first stop input 17 which is equal to the delays L1+L2 that are caused by the signal path between the output of the clock generator 11 and the light pulse emitted by the laser 15.

The TOF arrangement 10 is configured for measuring the laser driver delay. In the calibration phase, the TOF arrangement 10 as shown in FIG. 7 is performs a calibration measurement of the laser driver delay. The clock signal CLK is connected to the laser driver 12 and to the start input 16 of the TDC 14 representing the start pulse. In parallel, the clock signal CLK propagates through the interface connection to the laser driver 12 and the circuit of the laser driver 12 itself until the current I starts to flow through the laser 15. The fast current sensor 95 and the sensor buffer 96 are used to detect a certain current threshold which is defined by the lasing threshold of the laser 15. The sensor buffer 96 may be realized as a fast voltage comparator. The current/voltage comparator 96 generates the stop pulse at the first stop input 17 of the TDC. The difference between STOP1 and START represents:

$$L1 + L2 = \text{delay}_{core\_to\_laser\_driver} + \text{delay}_{clock\_to\_light}$$

These steps of the method measure the actual values of the delays L1, L2 at a certain process corner or temperature during the calibration phase.

In an alternative, not shown embodiment, the laser driver 12 has a terminal coupled via the laser 15 to the reference potential terminal 55. The laser driver 12 may also be connected to the reference potential terminal 55. The current sensor 95 is arranged in series to the laser 15. The current sensor 5 couples the laser driver 12 to the laser 15 or couples the laser 15 to the reference potential terminal 55.

Figure 8:
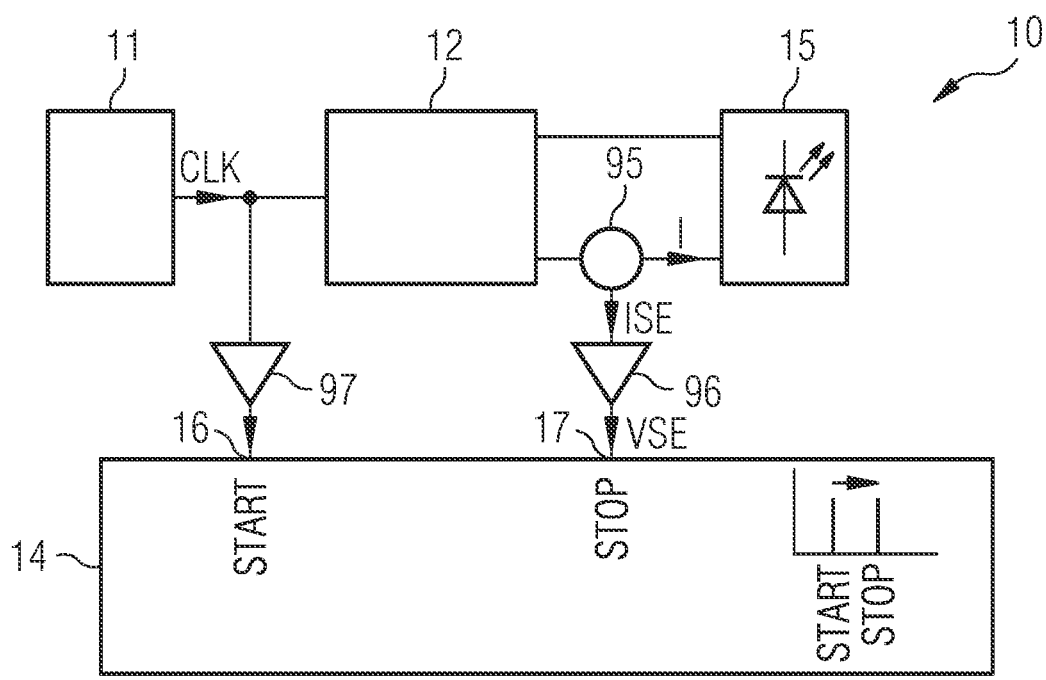

FIG. 8 shows a further example implementation of the TOF arrangement 10 that is a further development of the above-shown embodiments. The TOF arrangement 10 further comprises an additional buffer 97 that is arranged between the output of the clock generator 11 and the start input 16 of the TDC 14. The additional buffer 97 may be realized as a comparator. The additional buffer 97 may be a replica of the sensor buffer 96. Thus, a delay caused by the additional buffer 97 and a delay caused by the sensor buffer 96 are equal. Thus, the TOF arrangement 10 precisely measures the delay L1+L2 between a pulse of the clock signal CLK and a light pulse. The TOF arrangement 10 of FIG. 8 is similar to the TOF arrangement 10 of FIG. 7, but with the comparator replica 97 in the START signal path. The comparator replica 97 in the start path improves the time measurement accuracy as the delay of the comparator 96 is no longer present in the measurement result. Therefore, the delay of the comparator 96 drops out of the time measurement.

Figure 9:
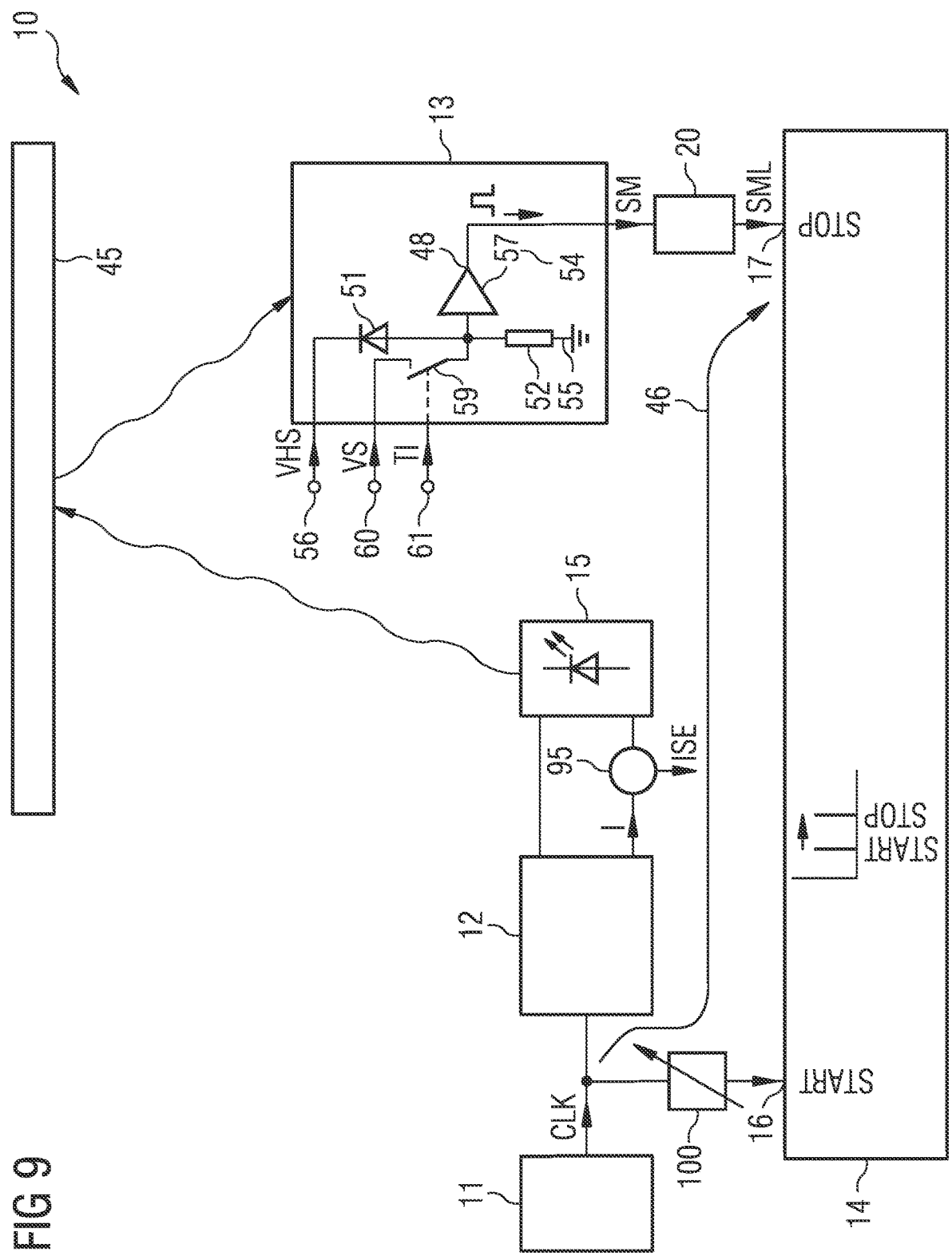
FIGS. 9 to 13 show further example implementations of a TOF arrangement with a measurement photodiode circuit.

FIG. 9 shows an additional example embodiment of the TOF arrangement 10 that is a further development of the above-shown embodiments. A measurement path 46 couples the output of the clock generator 11 to the first stop input 17 of the TDC 14. The measurement path 46 comprises the laser driver 12, the laser 15, the optical measurement path 43, the measurement photodiode circuit 13 and the measurement readout logic 20. The TOF arrangement 10 comprises an adjustable delay circuit 100. The adjustable delay circuit 100 couples the output of the clock generator 11 to the start input 16 of the TDC 14. The measurement photodiode circuit 13 may be realized such as one of the photodiode circuits 50 shown in FIGS. 3A to 3C.

In FIG. 9, the TOF arrangement 10 operates in a measurement phase. However, in the measurement phase, the measurement photodiode circuit 13 is configured so that it can only be triggered by a photon absorbed by the avalanche photodiode 51. During the measurement phase, no electric triggering of the measurement photodiode circuit 13 is performed.

The value of the delay of the adjustable delay circuit 100 is determined in the calibration phase. Thus, the value of the delay of the adjustable delay circuit 100 is e.g. equal to the sum of the delays L1+L2 between the pulse of the clock signal CLK of the clock generator 11 and the onset of the light pulse plus the delay L3 between a rise of the diode node voltage VAN and the pulse of the measurement readout logic signal SML at the output of the measurement readout logic 20. Thus, the TDC 14 determines a delay between a pulse at the start input 16 to a pulse at the first stop input 17 of the TDC 14 that is equal to the time-of-flight TOF of photons propagating at the optical measurement path 43.

The result of the calibration can be used for compensation during the distance measurement, e.g. in the measurement phase following the calibration phase. Knowing the readout and laser driver delays L1+L2+L3, and assuming the delay_core_to_TDC is negligible, the time of flight can be calculated:

$$result_{TDC1} = delay_{stop\_pulse_M} - delay_{start\_pulse_M} -$$
$$(delay_{core\_to\_laser\_driver} + delay_{clock\_to\_light} + delay_{sensor\_to\_TDC}) \approx TOF$$

Subtraction of the propagation delay is done by delaying the start signal in the analog domain, e.g. using the adjustable delay circuit as shown in FIG. 9. The adjustable delay circuit 100 may be realized as a controllable delay cell controlled by the evaluation circuit 37. As shown in FIG. 9, the propagation delay measurement of the sensor readout and the laser driver 12 can be used to compensation. Therefore, during the measurement procedure, the START trigger can be delayed so that the first bin of the histogram represents zero distance.

Alternatively, subtraction of the propagation delay can be done by delaying the start signal in the digital domain, e.g. by shifting histogram bins. Thus, the TOF arrangement 10 may be realized without the adjustable delay circuit 100. Delaying can be done in digital (shifting histogram bin) or analog (delay cells).

In an alternative, not shown embodiment, the TOF arrangement 10 comprises switches and/or multiplexers. In a first part of the calibration phase, the TOF arrangement 10 is configured to measure the delay L3 of the readout logic 62 as shown in FIGS. 5 and 6. In a second part of the calibration phase, the TOF arrangement 10 is configured to measure the delays L1+L2 of the laser driver 12 as shown in FIGS. 7 and 8. The first part may be before or after the second part. In the measurement phase, the TOF arrangement 10 is configured to measure the time-of-flight TOF, as shown in FIG. 9. The not-shown switches and multiplexers connect appropriate nodes and outputs to the start input 16 and the first and the second stop input 17, 93 in the parts of the calibration phase and the measurement phase.

In an alternative, not shown embodiment, the measurement photodiode circuit 13 is realized without the enable switch 59, the trigger input 61 and the supply terminal 60.

In an alternative, not shown embodiment, the clock generator 11 is coupled via the adjustable delay circuit 100 to the first stop input 16 of the TDC 14 and the output of the measurement readout logic 20 is coupled to the second stop input 93.

Figure 10:
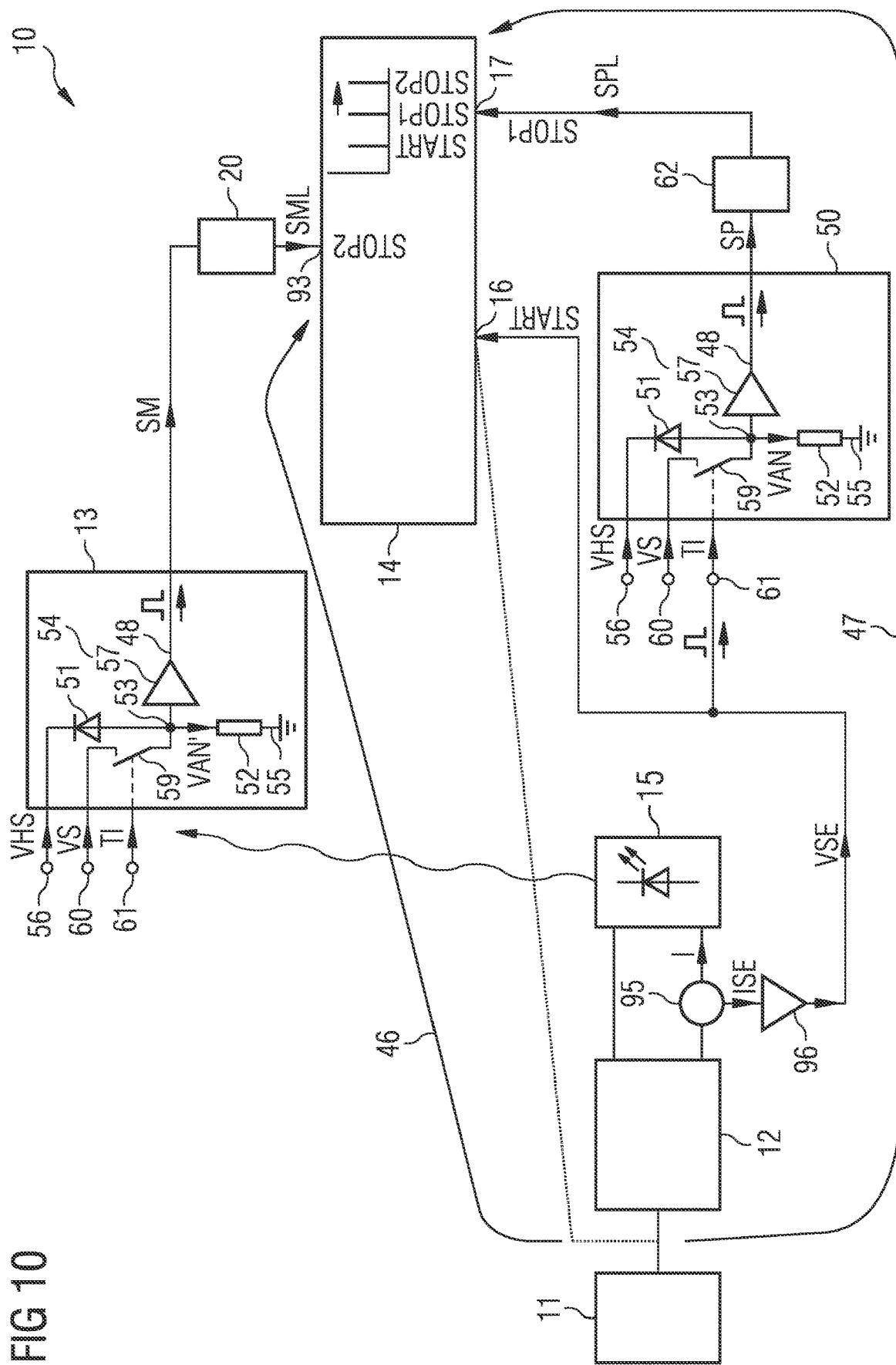

FIG. 10 shows a further example embodiment of the TOF arrangement 10 that is a further development of the above-shown embodiments. The TOF arrangement 10 comprises the measurement path 46 and the electrical calibration path 47. The electrical calibration path 47 couples the output of the clock generator 11 to the start input 16 and to the first stop input 17 of the TDC 14. The electrical calibration path 47 is free of an optical path or optical transmission. The electrical calibration path 47 comprises the laser driver 12, the current sensor 95, the sensor buffer 96, the photodiode circuit 50 and the readout logic 62. The electrical calibration path 47 is free of a signal transmitted by a photon.

The measurement path 46 couples the output of the clock generator 11 to the second stop input 93 of the TDC 14. The measurement path 46 comprises the laser driver 12, the laser 15, the optical measurement path 43, the measurement photodiode circuit 13 and the measurement readout logic 20. The measurement photodetector circuit 13 is coupled via the measurement readout logic 20 to the second stop input 93 of the TDC 14. In an embodiment, the measurement path 46 and the electrical calibration path 47 may be both used in the measurement phase.

The output of the clock generator 11 is coupled via the laser driver 12 and the current sensor 95 to the laser 15. The output of the current sensor 95 is coupled via the sensor buffer 96 to the start input 16 of the TDC 14. Moreover, the output of the current sensor 95 is coupled via the sensor buffer 96 to the trigger input 61 of the photodiode circuit 50. Thus, the trigger input 61 of the photodiode circuit 50 is directly connected to the start input 16 of the TDC 14. The first output 48 of the readout circuit 54 of the photodiode circuit 50 is coupled via the readout logic 62 to the first stop input 17 of the TDC 14. The photodiode circuit 50 and the measurement photodiode circuit 13 may be realized such as shown in FIGS. 3A to 3B, wherein the sense buffer 58 may be omitted.

In an alternative embodiment, indicated by dashed lines, the output of the clock generator 11 may be directly connected to the start input 16 of the TDC 14. The connection of the sensor buffer 96 to the start input 16 may be omitted.

Figure 11:
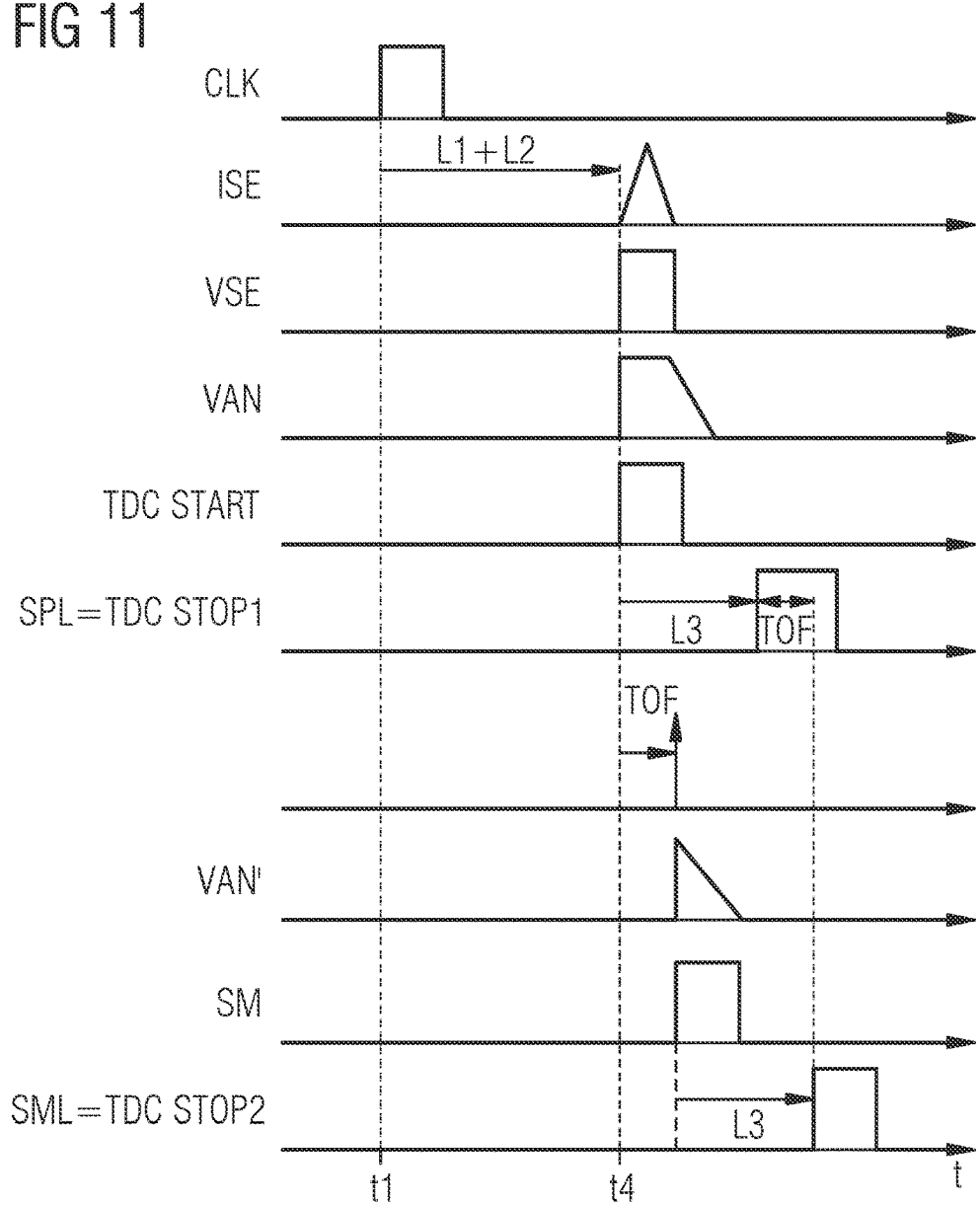
Figure 12:
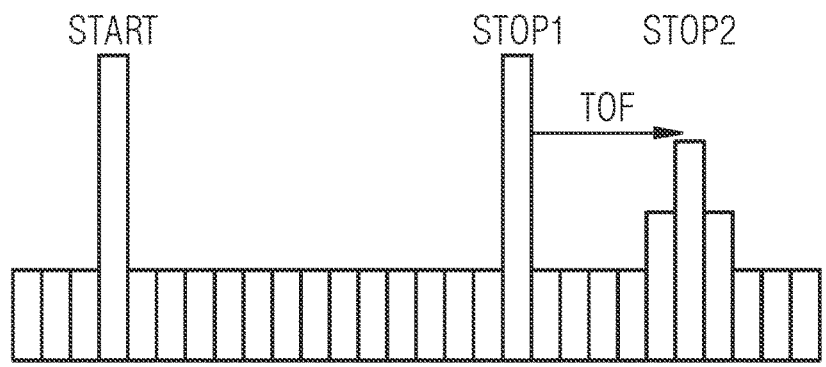

The TOF arrangement 10 is configured as a cascaded structure, where the clock signal CLK is first guided through the laser driver 12 and then through the SPAD array before it triggers the TDC 14. Thus, the clock signal CLK may be guided through the laser driver 12, the photodiode circuit 50 and the readout logic 62 and optionally through further circuits to the first stop input 17. Therefore, the signal delays are automatically excluded from the measurement. In FIG. 11, the signal flow is described and FIG. 12 shows the expected histogram output.

Alternatively, in the Figure the START signal is derived from the SPAD sense output but due to the double differential measurement alternative taps can be used as well.

FIG. 11 shows examples of signals of a TOF arrangement 10 such as the TOF arrangement shown in FIG. 10. The signals depend on the time t in the timing diagram of this implementation. In the first point of time t1, the clock generator 11 generates a pulse of the clock signal CLK with a rising edge. Thus, the laser driver 12 and the laser 15 start to operate. In the point of time t4 that is delayed by the delays L1+L2 with respect to the first point of time t1, the current I flowing through the current sensor 95 starts to rise; thus, the sensor buffer 96 provides a sensor buffer signal VSE as a result of the rise of the current I measured by the current sensor 95. The sensor buffer signal VSE is provided to the start input 16 of the TDC 14. Thus, the TDC 14 stores the states of the elements of the ring oscillator and the counter value in the first latch.

Simultaneously, the sensor buffer signal VSE is provided to the trigger input 61 of the photodiode circuit 50, resulting in a rise of the diode node voltage VAN. Thus, a pulse of the readout signal SP is provided at the first output 48 of the photodiode circuit 50 and is applied via the readout logic 62 to the first stop input 17 of the TDC 14. The readout logic 62 may be implemented as a replica of the measurement readout logic 20. Thus, the readout logic 62 provides the same delay value as the measurement readout logic 20. The operation of the readout circuit 54 in the photodiode circuit 50 and of the readout logic 62 causes a readout delay L3 between a pulse generated by the sensor buffer 96 and a pulse generated by the readout logic 62.

Since at the fourth point of time t4, the current I through the laser 15 rises, photons travel along the optical measurement path 43 to the target 45 and from the target 45 to the measurement photodiode circuit 13 resulting in a rise of the diode node voltage VAN' of the measurement photodiode circuit 13. The difference between the rise of the current I through the laser 15 and the rise of the diode node voltage VAN is the time-of-flight TOF. The rise of the diode node VAN' in the measurement photodiode circuit 13 results in a pulse of the measurement readout signal SM which is provided via the measurement readout logic 20 causing the readout delay L3 to the second stop input 93 of the TDC 14.

Since the delay L3 between the photodiode circuit 50 and the first stop input 17 is equal to the delay L3 between the measurement photodiode circuit 13 and the second stop input 93, the difference in time between the pulse at the first stop input 17 and the pulse at the second stop input 93 is equal to the time-of-flight TOF. Thus, the TDC 14 is configured to measure this difference that is the time-of-flight TOF, as shown in FIG. 12.

The TOF arrangement implements a cascaded signal flow. The trigger signal propagates first to the laser driver 12 which drives the current I through the laser 15. The current comparator 96 generates a rising edge at the point in time t4 were the photons are emitted. This signal is connected to the sensor and propagates through the electrically triggered calibration pixel 50 and the readout logic 62 to the STOP1 input 17 of the TDC 14. The returning photons, detected by the measurement sensor 21, propagate to the sense pixel 13 and the readout delay 20 and reach the STOP2 input 93 of the TDC 14. The time of flight TOF is represented by the difference in time from STOP1 to STOP2.

TOF=(TDC STOP2−TDC START)−(TDC STOP1−TDC START)

FIG. 12 shows an example embodiment of a histogram of the TOF arrangement 10 shown in FIG. 10 with the signals shown in FIG. 11. On the x axis a number of bins is shown, whereas on the y axis the number of signals falling in a particular bin is illustrated. The time-of-flight TOF is the difference between the time represented by the STOP2 bin and the STOP1 bin.

Figure 13:
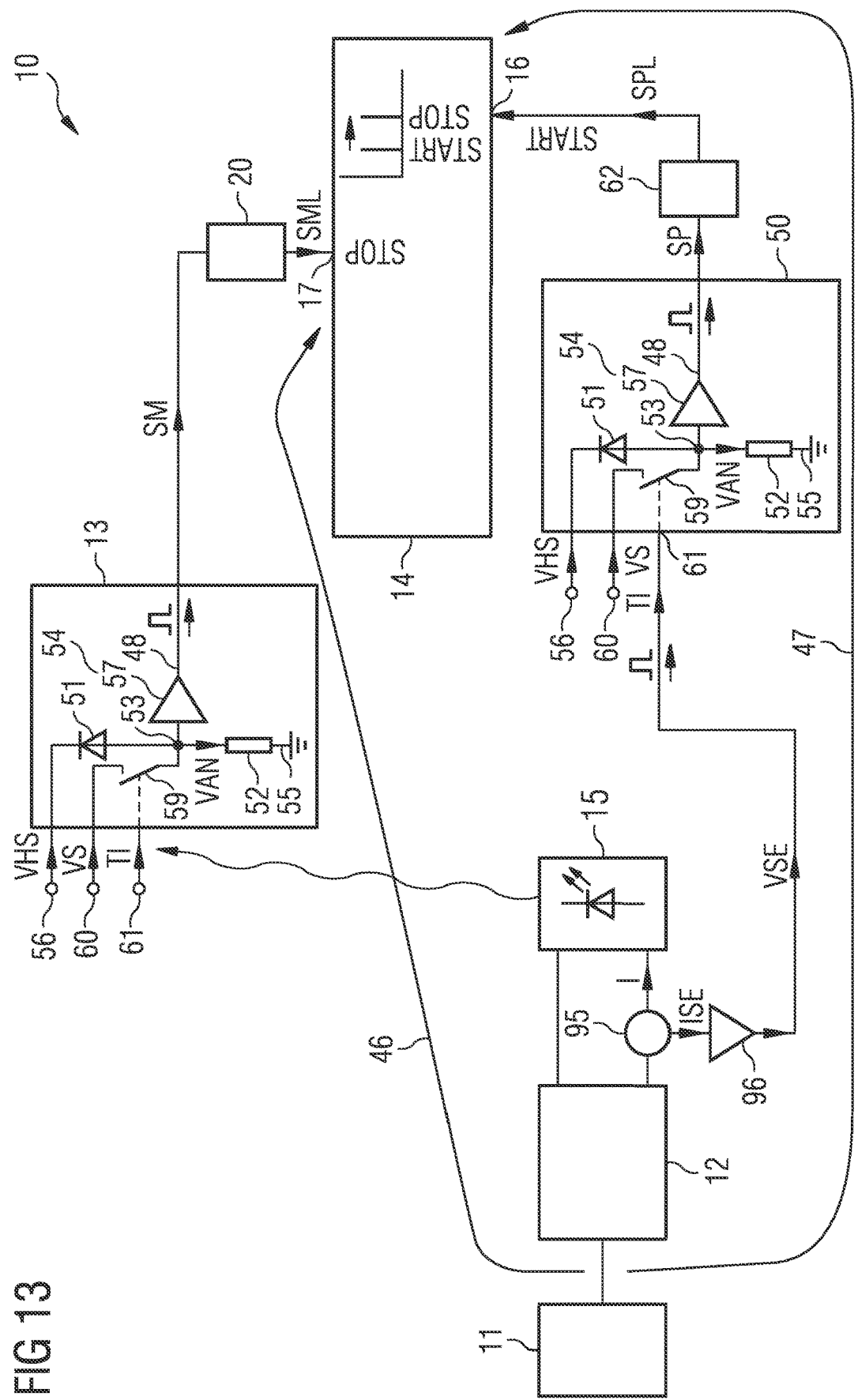

FIG. 13 shows a further example implementation of the TOF arrangement 10 that is a further development of the above-shown embodiments. The measurement path 46 couples the output of the clock generator 11 to the first stop input 17 of the TDC 14. The measurement photodiode circuit 13 is coupled via the measurement readout logic 20 to the first stop input 17 of the TDC 14. The electrical calibration path 47 couples the output of the clock generator 11 to the start input 16 of the TDC 14. The clock generator 11 is coupled via the laser driver 12, the current sensor 95 and the sensor buffer 96 to the trigger input 61 of the photodiode circuit 50. The photodiode circuit 50 is coupled via the readout logic 62 to the start input 16 of the TDC 14.

The photodiode circuit 50 and the readout logic 62 have the same delay L3 as the measurement photodiode circuit 13 and the measurement readout logic 20. The difference between the pulse at the first stop input 17 of the TDC 14 and the pulse at the start input 16 of the TDC 14 is equal to the time-of-flight

TOF:TOF=TDC STOP−TDC START

In FIG. 13, the same measurement using a two-channel TDC is shown as in FIGS. 10-12. In this case, the START signal is generated by the output of the SPAD readout circuitry such as the readout logic 62. The TDC 14 is designed as two-channel TDC. Therefore, no double-differential measurement is used.

The TOF arrangement 10 shown in FIGS. 10 and 13 may be operated without the use of a calibration phase. The mode of operation of the TOF arrangement 10 as shown in FIGS. 10 and 13 may be realized exclusively by the measurement phase.

Alternatively, the TOF arrangement 10 shown in FIGS. 10 and 13 may be operated in a calibration phase and a following measurement phase.

FIG. 14 shows an example implementation of details of the TOF arrangement 10 that is a further development of the above-shown embodiments. The clock generator 11 may be realized as a multiphase clock generator. For example, the clock generator 11 may generate the clock signal CLK with different clock phases clk0 to clk3. The clock signal CLK shown above may be equal to a zero clock phase clk0. As shown in FIG. 14, a pulse of a first clock phase clk1 follows a pulse of the zero clock phase clk0. Moreover, a pulse of a second clock phase clk2 follows the pulse of the first clock phase clk1. A pulse of a third clock phase clk3 follows the pulse of the second clock phase clk2. A second pulse of the zero clock phase clk0 follows the pulse of the third clock phase clk3 and so on. The four clock phases clk0 to clk3 have the same period. The four clock phases clk0 to clk3 have the value 1 only for a short duration. Most of the time the clock phases clk0 to clk3 have the value zero.

The TOF arrangement 10 additionally comprises a multiplexer 105. The multiplexer 105 is connected on its output side to the start input 16 of the TDC 14. The multiplexer 105 comprises two inputs: A first input is connected to the output of the current sensor 95 via the sensor buffer 96. A second input is connected to the output of the clock generator 11. The clock signal CLK with the zero clock phase clk0 is provided by the clock generator 11 to the input side of the laser driver 12. The clock signal CLK with the zero clock phase clk0 is provided to the second input of the multiplexer 105. In the calibration phase, the multiplexer 105 provides either the clock phase clk0 or the sensor buffer signal VSE to the start input 16 of the TDC 14. The clock signal CLK having the first clock phase clk1 is provided to the first stop input 17 of the TDC 14.

In FIG. 14, a histogram shows the results for both positions of the multiplexer 105. A first peak P1 shows the time between the generation of a pulse of the current sense signal ISE and a pulse of the first clock phase clk1. A second peak P2 shows the time between a pulse of the zero clock phase clk0 and a pulse of the first clock phase clk1. The difference between the centers of the first and second peak P1, P2 is equal to the laser driver delay, named L2 in FIG. 2. Thus, the laser driver delay L2 can be measured with this configuration of the TOF arrangement 10 in the calibration phase.

Figure 15:
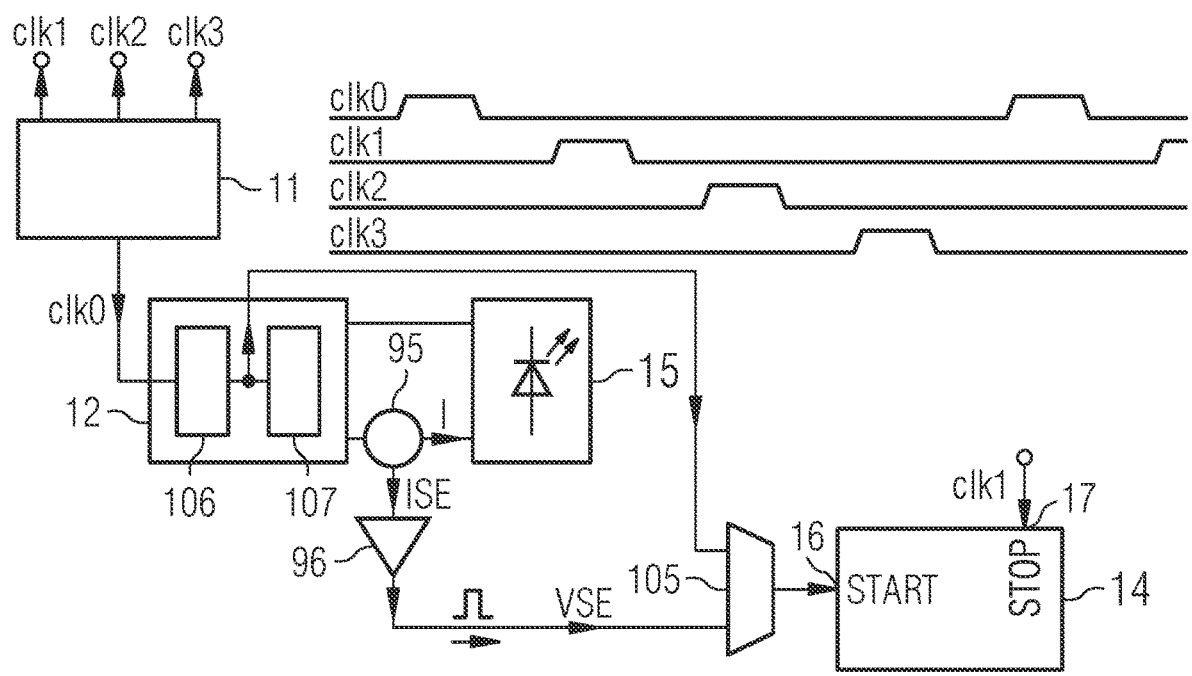

The implementation as outlined in the Figures above may require various multiplexers. As each multiplexer adds delays that are in general significantly higher than the resolution of the TDC, a double differential approach to the measurement can be advantageous. FIGS. 14 and 15 describe the procedure of how to measure the VCSEL pulse timing using the double differential approach. In FIG. 14, an implementation in silicon of the VCSEL driver measurement scheme is shown. Using a double differential measurement setup requires two rounds of measurements, and the resulting histograms are used to calculate the difference.

FIG. 15 shows an example implementation of the TOF arrangement 10 that is a further development of the above-shown embodiments. The laser driver 12 comprises a first driver block 106 and a second driver block 107. The second input of the multiplexer 105 is connected to a node between the first and the second driver block 106, 107. Thus, the configuration is able to measure the delay caused by the second driver block 107 of the laser driver 12. The laser driver timing is measured more accurate in FIG. 15 in comparison to FIG. 14, because the zero clock phase clk0 at the TDC input 16 and the zero clock phase clk0 at the laser driver 12 can differ by several nanoseconds. By using a separate measurement path from the zero clock phase clk0 at the laser driver input to the TDC 14, the measurement can be more accurate and measures only the laser driver delay L2.

Figure 16:
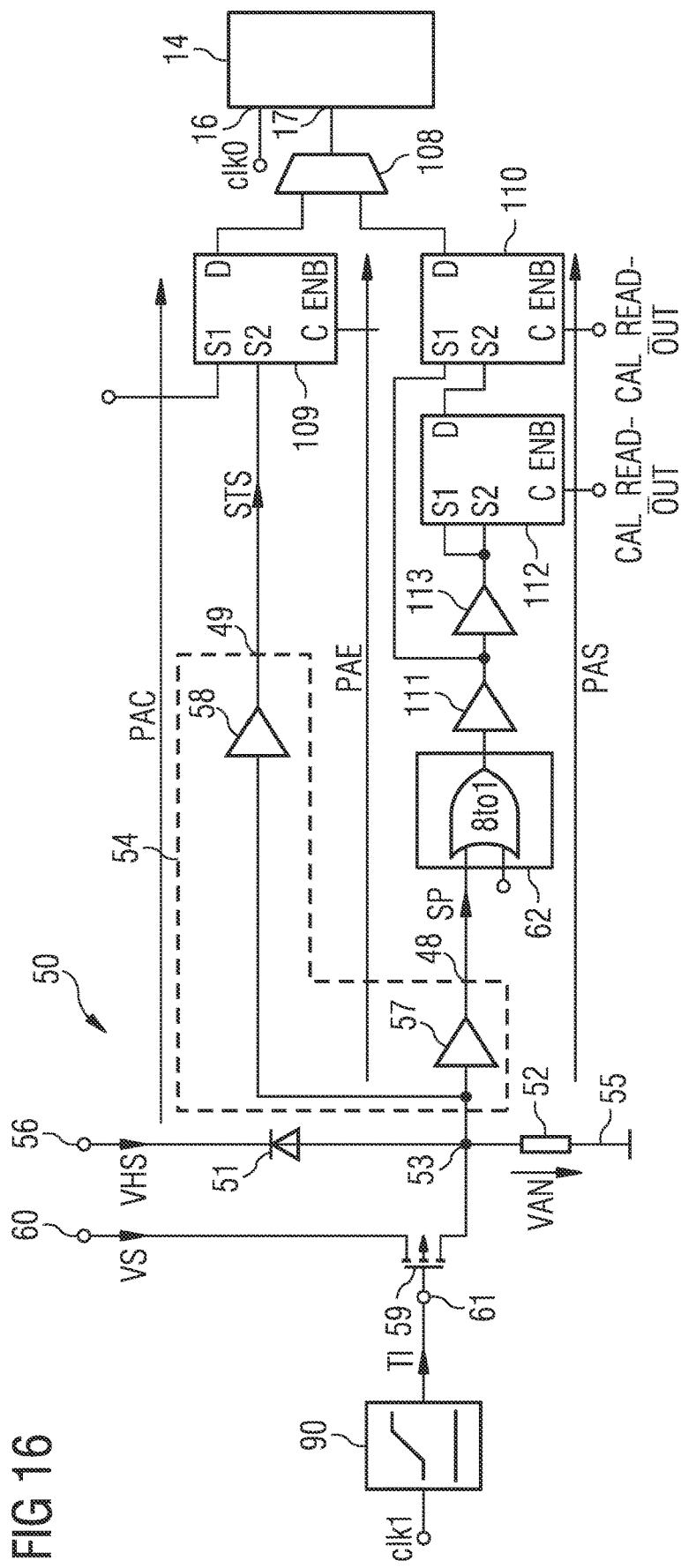

FIG. 16 shows a further example implementation of details of the TOF arrangement 10 that is a further development of the above-shown embodiments. In FIG. 16, the quencher calibration is disclosed in more details. The coupling circuit 90, which is shown e.g. in FIGS. 5 and 6, may comprise a level shifter. Thus, the pulse provided by the clock generator 11 is converted by the coupling circuit 90 to the trigger signal TI that is able to switch the enable switch 59 selectively in a conducting state and in a non-conducting state. The enable switch 59 is realized as a field-effect transistor. The enable switch 59 is implemented as a metal-oxide-semiconductor field-effect transistor. The supply voltage VS that is tapped at the supply terminal 60 may have the value of 3 Volt.

The TOF arrangement 10 comprises a calibration multiplexer 108 that is connected on its output side to the first stop input 17 of the TDC 14. The readout circuit 54 comprises the readout buffer 57 and the sense buffer 58 as shown in FIGS. 3A and 3B. The second output 49 of the readout circuit 54 is coupled via a first multiplexer 109 to a first input of the calibration multiplexer 108. The first output 48 of the readout circuit 54 is coupled via the readout logic 62 to a second input of the calibration multiplexer 108. Other inputs of the readout logic 62 may optionally be connected to outputs of other photodetector circuits that are implemented such as the photodetector circuit 50 shown in FIGS. 3A, 3B and 16. A second multiplexer 110 of the TOF arrangement 10 connected on its output side to the second input of the calibration multiplexer 108. A first input of the second multiplexer 110 is coupled via a second buffer 111 of the TOF arrangement 10 to the output of the readout logic 62. A second input of the second multiplexer 110 is coupled via a third multiplexer 112 and a third buffer 113 of the TOF arrangement 10 to the output of the second buffer 111.

The clock generator 11 provides the zero clock phase clk0 to the start input 16 of the TDC 14 and the first clock phase clk1 to the coupling circuit 90 that generates the trigger signal TI. The signal of the readout logic 62 can be provided either via the second buffer 111 to the first input of the second multiplexer 110 or via the second and the third buffer 111, 113 and the third multiplexer 112 to the second input of the second multiplexer 110.

A calibration start path PAC couples the diode node 53 to the calibration multiplexer 108 and comprises the sense buffer 58 and the first multiplexer 109. An event stop path PAE couples the diode node 53 to the calibration multiplexer 108 and comprises the readout buffer 57, the readout logic 62, the second buffer 111 and the second multiplexer 110. Additionally, a calibration stop path PAS couples the diode node 53 to the calibration multiplexer 108 and comprises the readout buffer 57, the readout logic 62, the second and the third buffer 111, 113 and the second and the third multiplexer 110, 112.

Thus, the photodiode circuit 50 shown in FIG. 16 is configured for the calibration phase and the measurement phase. Thus, different delays can be measured in the calibration phase by the TOF arrangement 10 as shown in FIG. 16 and the time-of-flight TOF can be measured during the measurement phase. The TOF arrangement 10 can be realized in an area-efficient way. In FIG. 16, the SPAD quencher calibration scheme is implemented in silicon. Use of a double differential measurement setup requires two rounds of measurements, and the resulting histograms are used to calculate the difference.

FIG. 17 shows an example implementation of the TDC 14. The TDC 14 comprises a ring oscillator 120 with a plurality of inverting elements 121 and a logic element 122. The plurality of inverting elements 121 is connected in series and an output of the last inverting element of the plurality of inverting elements is coupled to an input of the first inverting element of the plurality of inverting elements via the logic element 122. A further input of the logic element 122 may be connected to the further input 91 that may be an enable input 91. Moreover, the TDC 14 comprises a counter 124 connected on its input side to an output of one of the plurality of inverting elements. For example, an input of the counter 124 is connected to the output of the last inverting element of the plurality of inverting elements 121. A first latch 125 is connected on its input side to the outputs of the plurality of inverting elements 121 and to the outputs of the counter 124. Moreover, the first latch 125 may also be connected on its input side to the output of the logic element 122. A control input of the first latch 125 is connected to the start input 16 of the TDC 14.

Additionally, the TDC 14 comprises a second latch 126 connected on its input side to the outputs of the plurality of inverting elements and to the outputs of the counter 124. Moreover, the second latch 126 may be connected on its input side to the output of the logic element 122. A control input of the second latch 126 is connected to the first stop input 17 of the TDC 14. Optionally, the TDC 14 may comprise a third latch 127 connected on its input side to the outputs of the plurality of inverting elements and to the outputs of the counter 124. Moreover, the third latch 127 may be connected on its input side to the output of the logic element 122. A control input of the third latch 127 is connected to the second stop input 17 of the TDC 14.

Moreover, the TDC 14 comprises an evaluation block 128 having a first and a second decoder 129, 130. The first decoder 129 is connected on its input side to the outputs of the first latch 125. The second decoder 130 is connected on its input side to the outputs of the second latch 126. The evaluation block 128 comprises a first difference element 132 connected on its input side to the first and the second decoder 129, 130. The first difference element 132 may be realized as subtracting unit. Additionally, the TDC 14 comprises a histogram block 134 that is connected to the output of the first difference element 132.

The evaluation block 128 may comprise a third decoder 131 connected on its input side to the outputs of the third latch 127. The evaluation block 128 may comprise a second difference element 133 that is connected on its input side to the first and the third decoder 129, 131 and may be a subtracting unit. The histogram block 134 may be connected to the output of the second difference element 133.

An enable signal EN is provided to the further input 91 of the ring oscillator 120 and starts, respectively stops, the oscillation process performed by the ring oscillator 120. In the example shown in FIG. 17, the ring oscillator 120 comprises fourteen inverting elements 121. The number of inverting elements 121 can be varied depending on the desired application. The switching time of the inverting elements 121 and the number of inverting elements 121 determines an oscillation frequency of the ring oscillator 120. The counter 124 may count positive signal edges at the input. The counter value of the counter 124 and the logical states at the outputs of the plurality of inverting elements 121 and of the logic element 122 are stored in the first latch 125 at the point of time when a signal is provided to the start input 16 of the TDC 14. Due to the time difference between the enable signal EN and the signal at the start input 16, the ring oscillator 120 oscillates in a steady and stable state.

Correspondingly, the counter value of the counter 124 and the logical states at the outputs of the plurality of inverting elements 121 and of the logic element 122 are stored in the second latch 126 at the point of time when a signal is provided to the first stop input 17 of the TDC 14. The ring oscillator 120 continues to oscillate after the signal is provided to the first stop input 17. The counter value of the counter 124 and the logical states at the outputs of the plurality of inverting elements 121 and of the logic element 122 are stored in the third latch 127 at the point of time when a signal is provided to the second stop input 93 of the TDC 14.

These output states and counter values stored in the first latch 125 are provided to the first decoder 129. Similarly, the output states and counter values stored in the second or third latch 126, 127 are provided to the second or third decoder 130, 131.

When the decoding process of the first and the second decoder 129, 130 is finished, the first and the second decoder 129, 130 provide their output values to the first difference element 132. Thus, the first decoder 129 provides a starting value and the second decoder 130 provides a first stopping value. The evaluation block 124 is configured to provide a first difference value DI1 that is determined as a difference between the first stopping value and the starting value.

Additionally, when the decoding process of the first and the third decoder 129, 131 is finished, the first and the third decoder 129, 131 provide their output values to the second difference element 133. Thus, the first decoder 129 provides the starting value and the third decoder 131 provides a second stopping value. The evaluation block 124 is configured to provide a second difference value DI2 that is determined as a difference between the second stopping value and the starting value. Thus, the first, the second and the third latch 125 to 127 use the same ring oscillator 120 but are triggered by separate and trigger signals that are provided to the start input 16, the first stop input 17 and the second stop input 93 of the TDC 14. The first difference value DI1 is stored in the histogram 134. Correspondingly, the second difference value DI2 is stored in the histogram block 134.

Since the first and the second difference values are both calculated with respect to the starting value provided by the first decoder 121, both difference values can be stored in one common histogram in the histogram block 134. The histogram block 134 may be realized as a histogram memory. The histogram block 134 is connected to the evaluation circuit 37.

At the start of a calibration phase (and also at the start of a measurement phase), the histogram block 134 is set to zero. Each memory of the histogram block 134 such as each bin stores a bin value zero. During the calibration phase, an actual difference determines the bin of the histogram such as the address of the memory such that the bin value of this bin is increased by one. The calibration phase comprises a number L of clock cycles, thus a number L of differences is determined. The bins represent time differences and thus define a measured distance. In the calibration phase and in the measurement phase, the measurements are executed multiple times until the histogram has enough hits such that the calibration is finished or the target can be detected and distinguished from noise. One memory address represents a bin of the histogram and thus represents a possible distance. The bin value stored at the memory address contains the number of times that an event has been detected exactly at this time.

In one embodiment, the delay information may be e.g. determined using the histogram storing the first difference values DI1 and/or the histogram storing the second difference values DI2 in the calibration phase, e.g. by the histogram block 134 or the evaluation circuit 37. A measurement result may be determined e.g. using the histogram storing the first difference values DI1 and/or using the histogram storing the second difference values DI2 in the measurement phase e.g. by the histogram block 134 or the evaluation circuit 37. The time-of-flight signal ST (that is a corrected measurement result) may be determined using the measurement result gained in the measurement phase and the delay information gained in the calibration phase. Thus, the time-of-flight signal ST may be determined by shifting the measurement result as a function of the delay information, such as e.g. by shifting the measurement result by the delay determined in the calibration phase.

In an alternative, not shown embodiment, the evaluation block 128 is configured to provide a difference value between the output signals of the second and the third decoder 130, 131. Thus, the difference value provided by the difference element is determined as a difference between the second stopping value and the first stopping value.

In an alternative, not shown embodiment, the TDC 14 is realized without the third latch 127, the third decoder 131 and the second difference element 133.

FIG. 18A shows an alternative example implementation of the TOF arrangement 10 in the calibration phase that is a further development of the above-shown examples, whereas FIG. 18B shows this example implementation in the measurement phase. The TOF arrangement 10 comprises a further oscillator 140 that is coupled to the input side of the TDC 14. The further oscillator 140 may be realized as a high precision oscillator. The further oscillator 140 may be fabricated as an on-die oscillator. The semiconductor body 39 may comprises the further oscillator 140. The further oscillator 140 may be a trimmed oscillator. The trimming of the further oscillator 140 may be performed during fabrication of the TOF arrangement 10. The further oscillator 140 may be configured as a RC-oscillator.

Additionally, a photodiode circuit 141 of the TOF arrangement 10 is coupled to the input side of the TDC 14. The photodiode circuit 141 may be realized such as the photodiode circuit 50 or the measurement photodiode circuit 13, shown above. The TDC 14 comprises the ring oscillator 120. The TDC 14 is coupled to the evaluation circuit 37 that may be realized as a central processing unit. The TOF arrangement 10 comprises a first and a second memory 142, 143 that are both connected to the evaluation circuit 37.

In the calibration phase, the ring oscillator 120 and the further oscillator 140 are oscillating. The further oscillator 140 provides an oscillator signal SO to the TDC 14. The TDC 14 generates the histogram signal SH using the oscillator signal SO and provides it to the evaluation circuit 37. The histogram signal SH may comprise information about a frequency of the ring oscillator 120. Alternatively or additionally, the histogram signal SH may comprise information about one measurement or more than one measurement of internal paths, e.g. of the TOF arrangement 10, the readout logic 62 or the measurement readout logic 20, not-shown. Thus, alternatively or additionally, the histogram signal SH may comprise information about a delay or delays such as e.g. the readout delay L3 or the delay L1+L2 (named delay_core_to_laser_driver and delay_clock_to_light) between a pulse of the clock signal CLK and a light pulse. The TDC 14 may generate more than one histogram signal SH for the different values of the information.

The first memory 142 stores a table or tables. The table or tables may be predetermined. The values of the table or tables may be generated by measurement or simulation. The evaluation circuit 37 generates at least one compensation factor CF and stores it in the second memory 143. The at least one compensation factor CF is determined as a function of the histogram signal SH or histogram signals SH and of the table or tables stored in the first memory 142. The evaluation circuit 37 may calculate more than one compensation factor CF. Outside the calibration phase, the further oscillator 140 may be idle.

For example, a first pulse of the oscillator signal SO may be provided to the start input 16 and a second pulse of the oscillator signal SO may be provided to the first stop input 17 of the TDC 14. The TDC 14 determines the number of bins between the pulse at the first stop input 17 and the pulse at the start input 16. Since the time difference between the first and the second pulse of the oscillator signal SO is known, the duration of one bin can be calculated. The evaluation circuit 37 may determine the compensation factor CF using the number of bins that are between two pulses of the oscillator signal SO and using the table or tables in the first memory 142.

In an alternative, not-shown embodiment, the TOF arrangement 10 is free of the further oscillator 140. An external oscillator may generate the oscillator signal SO that is provided to the TDC 14. The external oscillator may be part of a device or system that comprises the TOF arrangement 10.

As shown in FIG. 18B, in the measurement phase, the photodiode circuit 141 provides the measurement readout signal SM to the TDC 14. The TDC 14 generates the histogram signal SH. The evaluation circuit 37 determines the time-of-flight signal ST as a function of the histogram signal SH and of the at least one compensation factor CF. The at least one compensation factor CF is determined in the calibration phase and used in the measurement phase. Thus, the TOF arrangement 10 performs an accurate measurement of the time-of-flight TOF that is compensated for PVT effects of silicon.

In an embodiment, the calibration phase and the measurement phase alternate. A calibration phase may be performed before each measurement phase or in predetermined time intervals. Thus, a temperature drift or supply voltage drift can be compensated.

In an alternative, not-shown embodiment, the TOF arrangement 10 comprises further photodiode circuits realized such as the photodiode circuit 141 and a measurement readout logic 20 coupling the photodiode circuits to the TDC 14. Thus, the TDC 14 receives the measurement readout logic signal SML in the measurement phase.

The invention claimed is:

1. A time-of-flight arrangement comprising:
a laser;
a laser driver;
a clock generator that is coupled to the laser via the laser driver;
  a photodiode circuit comprising an avalanche photodiode, a quenching circuit, a diode node and a readout circuit, wherein the quenching circuit is coupled via the diode node to the avalanche photodiode and an input of the readout circuit is connected to the diode node; and
a time-to-digital converter,
  wherein at least one of the clock generator and the readout circuit is coupled on its output side to the input side of the time-to-digital converter,
  wherein the time-of-flight arrangement is configured to operate in a calibration phase and in a measurement phase, wherein a delay information is determined in the calibration phase,
  wherein in the measurement phase, a parameter of a circuit of the time-of-flight arrangement is set as a function of the delay information or a measurement result is shifted as a function of the delay information,
  wherein the readout circuit comprises a readout buffer having an input coupled to the diode node and a sense buffer having an input connected to the diode node,
  wherein an output of the sense buffer is coupled to an input side of the time-to-digital converter and the sense buffer is configured to generate a trigger sense signal in a pulse form,
  wherein the readout buffer is configured to generate a readout signal in the form of a pulse,
  wherein the time-of-flight arrangement comprises a readout logic, and
  wherein an output of the readout buffer is coupled to an input of the readout logic and an output of the readout logic is coupled to the input side of the time-to-digital converter.

2. The time-of-flight arrangement according to claim 1,
wherein the time-to-digital converter comprises a ring oscillator, a counter, a first and a second latch, an evaluation block and a histogram block,
wherein the ring oscillator comprises a plurality of inverting elements,
wherein the counter is connected on its input side to an output of one of the plurality of inverting elements,
wherein the first and the second latch are connected on its input side to the ring oscillator and the counter and on its output side via the evaluation block to the histogram block, and
wherein a control input of the first latch is connected to a start input of the time-to-digital converter and a control input of the second latch is connected to a first stop input of the time-to-digital converter.

3. The time-of-flight arrangement according to claim 2,
comprising a readout logic, wherein an output of the sense buffer is coupled to the start input of the time-to-digital converter and an output of the readout buffer is coupled to the first stop input of the time-to-digital converter via the readout logic.

4. The time-of-flight arrangement according to claim 2,
comprising a readout logic, wherein an output of the sense buffer is coupled to the first stop input of the time-to-digital converter and an output of the readout buffer is coupled to a second stop input of the time-to-digital converter via the readout logic.

5. The time-of-flight arrangement according to claim 2,
wherein the time-to-digital converter comprises a third latch that is connected on its input side to the ring oscillator and to the counter and on its output side via the evaluation block to the histogram block, and wherein a control input of the third latch is connected to a second stop input of the time-to-digital converter.

6. The time-of-flight arrangement according to claim 1, wherein the photodiode circuit comprises an enable switch, a supply terminal and a trigger input, wherein the clock generator is coupled on its output side to the trigger input, the trigger input is connected to a control terminal of the enable switch and the enable switch couples the supply terminal to the diode node.

7. The time-of-flight arrangement according to claim 1, wherein the photodiode circuit comprises a trigger input and the readout circuit comprises a readout gate having a first input coupled via the trigger input to the clock generator and a second input coupled to the diode node.

8. The time-of-flight arrangement according to claim 1, wherein an output of the clock generator is coupled to a start input of the time-to-digital converter.

9. The time-of-flight arrangement according to claim 1, further comprising a current sensor coupled to the laser, wherein an output of the current sensor is coupled to an input side of the time-to-digital converter.

10. The time-of-flight arrangement according to claim 9, further comprising an electrical calibration path which comprises the laser driver, the current sensor and the photodiode circuit and couples the clock generator to the input side of the time-to-digital converter.

11. The time-of-flight arrangement according to claim 1, further comprising an adjustable delay circuit having an input coupled to an output of the clock generator and having an output coupled to the input side of the time-to-digital converter at least in the measurement phase, wherein the delay generated by the adjustable delay circuit is set as a function of the delay information in the measurement phase.

12. The time-of-flight arrangement according to claim 1, further comprising:
a further oscillator coupled to the time-to-digital converter that comprises a ring oscillator;
a first and a second memory; and
an evaluation circuit coupled to the time-to-digital converter and the first and the second memory.

13. A method for a time-of-flight measurement, the method comprising:
operating a time-of-flight arrangement in both a calibration phase and a measurement phase, wherein the time-of-flight arrangement comprises:
a laser;
a laser driver;
a clock generator that is coupled to the laser via the laser driver;
a photodiode circuit comprising an avalanche photodiode, a quenching circuit, a diode node and a readout circuit, wherein the quenching circuit is coupled via the diode node to the avalanche photodiode and an input of the readout circuit is connected to the diode node; and
a time-to-digital converter, wherein at least one of the clock generator and the readout circuit is coupled on its output side to the input side of the time-to-digital converter; determining a delay information in the calibration phase, and
setting a parameter of a circuit of the time-of-flight arrangement as a function of the delay information or shifting a measurement result as a function of the delay information in the measurement phase,
wherein the readout circuit comprises a readout buffer having an input coupled to the diode node and a sense buffer having an input connected to the diode node,
wherein the time-to-digital converter comprises a ring oscillator, a counter, a first and a second latch, an evaluation block and a histogram block,
wherein the ring oscillator comprises a plurality of inverting elements,
wherein the counter is connected on its input side to an output of one of the plurality of inverting elements,
wherein the first and the second latch are connected on its input side to the ring oscillator and the counter and on its output side via the evaluation block to the histogram block, and
wherein a control input of the first latch is connected to a start input of the time-to-digital converter and a control input of the second latch is connected to a first stop input of the time-to-digital converter.

14. A time-of-flight arrangement comprising:
a laser;
a laser driver;
a clock generator that is coupled to the laser via the laser driver;
a photodiode circuit comprising an avalanche photodiode, a quenching circuit, a diode node and a readout circuit, wherein the quenching circuit is coupled via the diode node to the avalanche photodiode and an input of the readout circuit is connected to the diode node; and
a time-to-digital converter,
wherein at least one of the clock generator and the readout circuit is coupled on its output side to the input side of the time-to-digital converter,
wherein the time-of-flight arrangement is configured to operate in a calibration phase and in a measurement phase, wherein a delay information is determined in the calibration phase, and
wherein in the measurement phase, a parameter of a circuit of the time-of-flight arrangement is set as a function of the delay information or a measurement result is shifted as a function of the delay information,
wherein the readout circuit comprises a readout buffer having an input coupled to the diode node and a sense buffer having an input connected to the diode node,
wherein the time-to-digital converter comprises a ring oscillator, a counter, a first and a second latch, an evaluation block and a histogram block,
wherein the ring oscillator comprises a plurality of inverting elements,
wherein the counter is connected on its input side to an output of one of the plurality of inverting elements,
wherein the first and the second latch are connected on its input side to the ring oscillator and the counter and on its output side via the evaluation block to the histogram block, and
wherein a control input of the first latch is connected to a start input of the time-to-digital converter and a control input of the second latch is connected to a first stop input of the time-to-digital converter.

* * * * *